United States Patent
Winig et al.

(10) Patent No.: US 12,191,977 B2
(45) Date of Patent: Jan. 7, 2025

(54) SATELLITE OPERATIONS WITH SECURE ENCLAVE FOR SECURE INBAND HOSTED PAYLOAD OPERATIONS

(71) Applicant: The Boeing Company, Chicago, IL (US)

(72) Inventors: Robert J. Winig, Rancho Palos Verdes, CA (US); Yi-Feng J. Chen, Irvine, CA (US)

(73) Assignee: The Boeing Company, Chicago, IL (US)

( * ) Notice: Subject to any disclaimer, the term of this patent is extended or adjusted under 35 U.S.C. 154(b) by 508 days.

(21) Appl. No.: 17/475,032

(22) Filed: Sep. 14, 2021

(65) Prior Publication Data

US 2023/0081825 A1 Mar. 16, 2023

(51) Int. Cl.
H04L 29/06 (2006.01)
H04B 7/185 (2006.01)

(52) U.S. Cl.
CPC ..... H04B 7/18565 (2013.01); H04B 7/18515 (2013.01); H04B 7/18519 (2013.01); H04B 7/18532 (2013.01); H04B 7/18589 (2013.01)

(58) Field of Classification Search
CPC ............... H04L 63/0428; H04L 5/0044; H04L 63/0272; H04L 67/12; H04W 12/03; H04W 4/40; H04W 84/06; H04B 7/18565
See application file for complete search history.

(56) References Cited

U.S. PATENT DOCUMENTS

| 7,444,565 B1* | 10/2008 | Haight | G01R 31/318516 713/193 |
| 9,621,255 B1* | 4/2017 | Chu | H04B 7/18506 |
| 2013/0077788 A1* | 3/2013 | Blanchard | H04B 7/18593 380/255 |
| 2018/0255024 A1* | 9/2018 | Chen | H04W 12/037 |
| 2018/0255455 A1* | 9/2018 | Winig | H04B 7/18582 |
| 2020/0076495 A1* | 3/2020 | Martinerie | H04W 12/03 |

* cited by examiner

Primary Examiner — William A Corum, Jr.
(74) Attorney, Agent, or Firm — Haynes and Boone, LLP

(57) ABSTRACT

Systems, methods, and apparatus for satellite operations with secure enclave for secure inband hosted payload operations are disclosed. In one or more embodiments, a method for payload operations comprises receiving, by a vehicle, host commands from a satellite operation portion of a host spacecraft operations center (SOC). The method further comprises reconfiguring a payload and at least bus component on the vehicle according to the host commands. Also, the method comprises transmitting, by the vehicle, host telemetry to the satellite operation portion of the host SOC. In addition, the method comprises receiving, by the vehicle, hosted commands from a secure enclave of the host SOC. Additionally, the method comprises reconfiguring the payload on the vehicle according to the hosted commands. Further, the method comprises transmitting, by a payload antenna on the vehicle, host payload data, hosted payload data, and the encrypted hosted telemetry to the secure enclave.

26 Claims, 12 Drawing Sheets

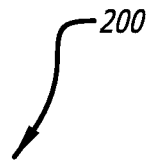

Summary of Transmission of Commands and Telemetry for Figure 1:

Host Commands:
A.) Transmitted on Out-of-band Frequencies
B.) Transmitted on Inband Frequencies from the Host SOC Host Telemetry:
C.) Transmitted on Out-of-band Frequencies
D.) Transmitted on Inband Frequencies to the Host SOC Hosted Commands:
E.) Transmitted on Out-of-band Frequencies
F.) Transmitted on Inband Frequencies from the Secure Enclave via the Host SOC
G.) Transmitted on Inband Frequencies from the Secure Enclave Hosted Telemetry:
H.) Transmitted on Inband Frequencies to the Secure Enclave via the Host SOC
I.) Transmitted on Inband Frequencies to the Secure Enclave

FIG. 2

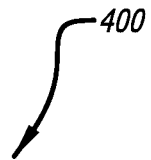

Summary of Transmission of Commands and Telemetry for Figure 3:

Host Commands:
A.) Transmitted on Inband Frequencies from the Host SOC

Host Telemetry:
B.) Transmitted on Out-of-band Frequencies
C.) Transmitted on Inband Frequencies to the Host SOC Hosted Commands:
D.) Transmitted on Out-of-band Frequencies
E.) Transmitted on Inband Frequencies from the Secure Enclave via the Host SOC
F.) Transmitted on Inband Frequencies from the Secure Enclave via Host Gateway Antenna 1
G.) Transmitted on Inband Frequencies from the Secure Enclave via Host Gateway Antenna 2

Hosted Telemetry:
H.) Transmitted on Out-of-band Frequencies
I.) Transmitted on Inband Frequencies to the Secure Enclave via the Host SOC
J.) Transmitted on Inband Frequencies to the Secure Enclave via Host Gateway Antenna 1
K.) Transmitted on Inband Frequencies to the Secure Enclave via Host Gateway Antenna 2

FIG. 4

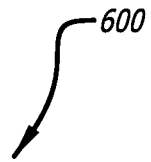

Summary of Transmission of Commands and Telemetry for Figure 5:

Host Commands:
A.) Transmitted on Out-of-band Frequencies
B.) Transmitted on Inband Frequencies from the Host SOC Host Telemetry:
C.) Transmitted on Out-of-band Frequencies
D.) Transmitted on Inband Frequencies to the Host SOC Hosted Commands:
E.) Transmitted on Out-of-band Frequencies
F.) Transmitted on Inband Frequencies from the Secure Enclave via the Host SOC
G.) Transmitted on Inband Frequencies from the Secure Enclave via Host Gateway Antenna 1
H.) Transmitted on Inband Frequencies from the Secure Enclave via Host Gateway Antenna 2

Hosted Telemetry:
I.) Transmitted on Out-of-band Frequencies
J.) Transmitted on Inband Frequencies to the Secure Enclave via the Host SOC
K.) Transmitted on Inband Frequencies to the Secure Enclave via Host Gateway Antenna 1
L.) Transmitted on Inband Frequencies to the Secure Enclave via Host Gateway Antenna 2

FIG. 6

| Scenario No. | Host CMD | Host TLM | Hosted CMD via Host SOC | Hosted TLM via Host SOC | Hosted CMD Inband from Secure Enclave | Hosted TLM Inband to Secure Enclave |
|---|---|---|---|---|---|---|
| 1 | Outband | Outband |  |  | via Host Payload | via Host Payload |
| 2 | Outband | Outband |  |  | via Host Payload | via Hosted Payload |
| 3 | Outband | Outband |  |  | via Hosted Payload | via Host Payload |
| 4 | Outband | Outband |  |  | via Hosted Payload | via Hosted Payload |
| 5 | Outband | Inband |  |  | via Host Payload | via Host Payload |
| 6 | Outband | Inband |  |  | via Host Payload | via Hosted Payload |
| 7 | Outband | Inband |  |  | via Hosted Payload | via Host Payload |
| 8 | Outband | Inband |  |  | via Hosted Payload | via Hosted Payload |
| 9 | Inband | Outband |  |  | via Host Payload | via Host Payload |
| 10 | Inband | Outband |  |  | via Host Payload | via Hosted Payload |
| 11 | Inband | Outband |  |  | via Hosted Payload | via Host Payload |
| 12 | Inband | Outband |  |  | via Hosted Payload | via Hosted Payload |
| 13 | Inband | Inband |  |  | via Host Payload | via Host Payload |
| 14 | Inband | Inband |  |  | via Host Payload | via Hosted Payload |
| 15 | Inband | Inband |  |  | via Hosted Payload | via Host Payload |
| 16 | Inband | Inband |  |  | via Hosted Payload | via Hosted Payload |
| 17 | Outband | Outband | Outband |  |  | via Host Payload |
| 18 | Outband | Outband | Outband |  |  | via Hosted Payload |
| 19 | Outband | Outband | Inband |  |  | via Host Payload |
| 20 | Outband | Outband | Inband |  |  | via Hosted Payload |
| 21 | Outband | Inband | Outband |  |  | via Host Payload |
| 22 | Outband | Inband | Outband |  |  | via Hosted Payload |
| 23 | Outband | Inband | Inband |  |  | via Host Payload |
| 24 | Outband | Inband | Inband |  |  | via Hosted Payload |
| 25 | Inband | Outband | Outband |  |  | via Host Payload |
| 26 | Inband | Outband | Outband |  |  | via Hosted Payload |
| 27 | Inband | Outband | Inband |  |  | via Host Payload |
| 28 | Inband | Outband | Inband |  |  | via Hosted Payload |
| 29 | Inband | Inband | Outband |  |  | via Host Payload |
| 30 | Inband | Inband | Outband |  |  | via Hosted Payload |
| 31 | Inband | Inband | Inband |  |  | via Host Payload |
| 32 | Inband | Inband | Inband |  |  | via Hosted Payload |

*FIG. 9A* 900

| Scenario No. | Host CMD | Host TLM | Hosted CMD via Host SOC | Hosted TLM via Host SOC | Hosted CMD Inband from Secure Enclave | Hosted TLM Inband to Secure Enclave |
|---|---|---|---|---|---|---|
| 33 | Outband | Outband | | Outband | | |
| 34 | Outband | Outband | | Inband | via Host Payload | |
| 35 | Outband | Outband | | Outband | via Host Payload | |
| 36 | Outband | Outband | | Inband | via Host Payload | |
| 37 | Outband | Inband | | Outband | via Host Payload | |
| 38 | Outband | Inband | | Inband | via Host Payload | |
| 39 | Outband | Inband | | Outband | via Host Payload | |
| 40 | Outband | Inband | | Inband | via Host Payload | |
| 41 | Inband | Outband | | Outband | via Host Payload | |
| 42 | Inband | Outband | | Inband | via Host Payload | |
| 43 | Inband | Outband | | Outband | via Host Payload | |
| 44 | Inband | Outband | | Inband | via Host Payload | |
| 45 | Inband | Inband | | Outband | via Host Payload | |
| 46 | Inband | Inband | | Inband | via Host Payload | |
| 47 | Inband | Inband | | Outband | via Host Payload | |
| 48 | Inband | Inband | | Inband | via Host Payload | |

FIG. 9B  900

SATELLITE OPERATIONS WITH SECURE ENCLAVE FOR SECURE INBAND HOSTED PAYLOAD OPERATIONS

FIELD

The present disclosure relates to payload operations. In particular, it relates to satellite operations with a secure enclave for secure inband hosted payload operations.

BACKGROUND

Currently, typical payload operations for a vehicle (e.g., a satellite) have the ability to perform switching of inputs to outputs of the payload on the vehicle. All of this switching on the payload is commanded and controlled by a single satellite controller with no resource allocation privacy.

As such, there is a need for an improved payload operations design that allows for privacy in the allocation of resources on the payload.

SUMMARY

The present disclosure relates to a method, system, and apparatus for satellite operations with a secure enclave for secure inband hosted payload operations. In one or more embodiments, a method for payload operations comprises receiving, by a vehicle, encrypted host commands from a satellite operation portion of a host spacecraft operations center (SOC). In one or more embodiments, the encrypted host commands are host commands encrypted by the satellite operation portion of the host SOC utilizing a host communication security (COMSEC) variety. The method further comprises decrypting, by a host communication security module on the vehicle, the encrypted host commands by utilizing the host COMSEC variety to produce unencrypted host commands. Also, the method comprises reconfiguring a payload on the vehicle and at least bus component on the vehicle according to the unencrypted host commands. In addition, the method comprises encrypting, by the host communication security module, unencrypted host payload telemetry and unencrypted bus telemetry by utilizing the host COMSEC variety to produce encrypted host telemetry. Additionally, the method comprises transmitting, by the vehicle, the encrypted host telemetry to the satellite operation portion of the host SOC, which decrypts the encrypted host telemetry by utilizing the host COMSEC variety to produce the unencrypted host payload telemetry and the unencrypted bus telemetry.

Also, the method comprises receiving, by the vehicle, encrypted hosted commands from a secure enclave of the host SOC. In one or more embodiments, the encrypted hosted commands are hosted commands encrypted by the secure enclave by utilizing at least one hosted COMSEC variety. In addition, the method comprises decrypting, by at least one hosted communication security module on the vehicle, the encrypted hosted commands by utilizing at least one hosted COMSEC variety to produce unencrypted hosted commands. Additionally, the method comprises reconfiguring the payload on the vehicle according to the unencrypted hosted commands. In addition, the method comprises encrypting, by at least one hosted communication security module, unencrypted hosted payload telemetry by utilizing at least one hosted COMSEC variety to produce encrypted hosted telemetry. Further, the method comprises transmitting, by a payload antenna on the vehicle, host payload data, hosted payload data, and the encrypted hosted telemetry to the secure enclave, which decrypts the encrypted hosted telemetry by utilizing at least one hosted COMSEC variety to produce the unencrypted hosted payload telemetry.

In one or more embodiments, the encrypted host commands are transmitted from the satellite operation portion of the host SOC utilizing at least one out-of-band frequency band.

In at least one embodiment, the encrypted host commands are transmitted from the satellite operation portion of the host SOC utilizing at least one inband frequency band. In one or more embodiments, the encrypted host commands are transmitted from the satellite operation portion of the host SOC to the payload antenna on the vehicle via a secure terrestrial link and a gateway antenna.

In at least one embodiment, the encrypted host telemetry is transmitted from the vehicle utilizing at least one out-of-band frequency band.

In one or more embodiments, the encrypted host telemetry is transmitted from the vehicle utilizing at least one inband frequency band. In at least one embodiment, the encrypted host telemetry is transmitted from the payload antenna on the vehicle to the satellite operation portion of the host SOC via a gateway antenna and a secure terrestrial link.

In one or more embodiments, the encrypted hosted commands are transmitted from the secure enclave utilizing at least one out-of-band frequency band. In at least one embodiment, the encrypted hosted commands are transmitted from the secure enclave to the vehicle via the satellite operation portion of the host SOC.

In one or more embodiments, the encrypted hosted commands are transmitted from the secure enclave utilizing at least one inband frequency band. In at least one embodiment, the encrypted hosted commands are transmitted from the secure enclave to the payload antenna on the vehicle via the satellite operation portion of the host SOC. In at least one embodiment, the encrypted hosted commands are transmitted from the secure enclave to the payload antenna on the vehicle via a secure terrestrial link and a gateway antenna.

In one or more embodiments, the encrypted hosted telemetry is transmitted from the vehicle utilizing at least one inband frequency band. In at least one embodiment, the encrypted hosted telemetry is transmitted from the payload antenna on the vehicle to the secure enclave via a gateway antenna and a secure terrestrial link. In one or more embodiments, the encrypted hosted telemetry is transmitted from the payload antenna on the vehicle to the secure enclave via the satellite operation portion of the host SOC.

In at least one embodiment, the payload on the vehicle comprises a host payload and a hosted payload.

In one or more embodiments, the reconfiguring of the payload comprises adjusting: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, effective isotropic radiation power (EIRP) for at least one beam, transponder channels, and/or beam steering.

In at least one embodiment, the reconfiguring of the payload comprises reconfiguring: at least a portion of the payload antenna, at least one analog-to-digital converter, at least one digital-to-analog converter, at least one beamformer, at least one digital channelizer, at least one demodulator, at least one modulator, at least one digital switch matrix, at least one digital combiner, and/or at least one analog switch matrix.

In one or more embodiments, a method for payload operations comprises receiving, by a vehicle, encrypted host commands from a satellite operation portion of a host SOC. In one or more embodiments, the encrypted host commands are host commands encrypted by the satellite operation portion of the host SOC utilizing a host COMSEC variety. The method further comprises decrypting, by a host communication security module on the vehicle, the encrypted host commands by utilizing the host COMSEC variety to produce unencrypted host commands. Also, the method comprises reconfiguring a host payload on the vehicle according to the unencrypted host commands. In addition, the method comprises commanding at least one hosted payload on the vehicle on or off according to the unencrypted host commands. Additionally, the method comprises encrypting, by the host communication security module, unencrypted host payload telemetry by utilizing the host COMSEC variety to produce encrypted host telemetry. Also, the method comprises transmitting, by the vehicle, the encrypted host telemetry to the satellite operation portion of the host SOC, which decrypts the encrypted host telemetry by utilizing the host COMSEC variety to produce the unencrypted host payload telemetry.

In addition, the method comprises receiving, by the vehicle, encrypted hosted commands from a secure enclave of the host SOC. In one or more embodiments, the encrypted hosted commands are hosted commands encrypted by the secure enclave by utilizing at least one hosted COMSEC variety. Also, the method comprises decrypting, by at least one hosted communication security module on the vehicle, the encrypted hosted commands by utilizing at least one hosted COMSEC variety to produce unencrypted hosted commands. In addition, the method comprises reconfiguring at least one hosted payload on the vehicle according to the unencrypted hosted commands. Also, the method comprises encrypting, by at least one hosted communication security module, unencrypted hosted payload telemetry by utilizing at least one hosted COMSEC variety to produce encrypted hosted telemetry. Additionally, the method comprises transmitting, by a host payload antenna on the vehicle, host payload data. Also, the method comprises transmitting, by a hosted payload antenna on the vehicle, hosted payload data. Further, the method comprises transmitting, by the vehicle, the encrypted hosted telemetry, to the secure enclave, which decrypts the encrypted hosted telemetry by utilizing at least one hosted COMSEC variety to produce the unencrypted hosted payload telemetry.

In at least one embodiment, the encrypted host commands are transmitted from the satellite operation portion of the host SOC utilizing at least one out-of-band frequency band.

In one or more embodiments, the encrypted host commands are transmitted from the satellite operation portion of the host SOC utilizing at least one inband frequency band. In at least one embodiment, the encrypted host commands are transmitted from the satellite operation portion of the host SOC to the host payload antenna or the hosted payload antenna on the vehicle via a secure terrestrial link and a gateway antenna.

In at least one embodiment, the encrypted host telemetry is transmitted from the vehicle utilizing at least one out-of-band frequency band.

In one or more embodiments, the encrypted host telemetry is transmitted from the vehicle utilizing at least one inband frequency band. In at least one embodiment, the encrypted host telemetry is transmitted from the host payload antenna or the hosted payload antenna on the vehicle to the satellite operation portion of the host SOC via a gateway antenna and a secure terrestrial link.

In at least one embodiment, the encrypted hosted commands are transmitted from the secure enclave utilizing at least one out-of-band frequency band. In one or more embodiments, the encrypted hosted commands are transmitted from the secure enclave to the vehicle via the satellite operation portion of the host SOC.

In at least one embodiment, the encrypted hosted commands are transmitted from the secure enclave utilizing at least one inband frequency band. In one or more embodiments, the encrypted hosted commands are transmitted from the secure enclave to the host payload antenna on the vehicle via the satellite operation portion of the host SOC. In at least one embodiment, the encrypted hosted commands are transmitted from the secure enclave to the host payload antenna or the hosted payload antenna on the vehicle via a secure terrestrial link and a gateway antenna.

In one or more embodiments, the encrypted hosted telemetry is transmitted from the vehicle utilizing at least one out-of-band frequency band.

In at least one embodiment, the encrypted hosted telemetry is transmitted from the vehicle utilizing at least one inband frequency band. In one or more embodiments, the encrypted hosted telemetry is transmitted from the host payload antenna or the hosted payload antenna on the vehicle to the secure enclave via the satellite operation portion of the host SOC. In at least one embodiment, the encrypted hosted telemetry is transmitted from the host payload antenna or the hosted payload antenna on the vehicle to the secure enclave via a gateway antenna and a secure terrestrial link.

In one or more embodiments, the host payload and at least one hosted payload are separate units.

In at least one embodiment, the reconfiguring of the host payload comprises adjusting: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, EIRP for at least one beam, transponder channels, and/or beam steering.

In one or more embodiments, the reconfiguring of at least one hosted payload comprises adjusting: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, EIRP for at least one beam, transponder channels, and/or beam steering.

In at least one embodiment, the reconfiguring of the host payload comprises reconfiguring: at least a portion of the host payload antenna, at least one analog-to-digital converter, at least one digital-to-analog converter, at least one beamformer, at least one digital channelizer, at least one demodulator, at least one modulator, at least one digital switch matrix, at least one digital combiner, and/or at least one analog switch matrix.

In one or more embodiments, the reconfiguring of at least one hosted payload comprises reconfiguring: at least a portion of the hosted payload antenna, at least one analog-to-digital converter, at least one digital-to-analog converter, at least one beamformer, at least one digital channelizer, at least one demodulator, at least one modulator, at least one digital switch matrix, at least one digital combiner, and/or at least one analog switch matrix.

In at least one embodiment, a system for payload operations comprises a vehicle to receive encrypted host commands from a satellite operation portion of a host SOC. In one or more embodiments, the encrypted host commands are host commands encrypted by the satellite operation portion of the host SOC utilizing a host COMSEC variety. The system further comprises a host communication security module on the vehicle to decrypt the encrypted host commands by utilizing the host COMSEC variety to produce unencrypted host commands. Also, the system comprises a payload on the vehicle and at least bus component on the vehicle to reconfigure according to the unencrypted host commands. In addition, the system comprises the host communication security module to encrypt unencrypted host payload telemetry and unencrypted bus telemetry by utilizing the host COMSEC variety to produce encrypted host telemetry. Additionally, the system comprises the vehicle to transmit the encrypted host telemetry to the satellite operation portion of the host SOC, which decrypts the encrypted host telemetry by utilizing the host COMSEC variety to produce the unencrypted host payload telemetry and the unencrypted bus telemetry.

In addition, the system comprises the vehicle to receive encrypted hosted commands from a secure enclave of the host SOC. In one or more embodiments, the encrypted hosted commands are hosted commands encrypted by the secure enclave by utilizing at least one hosted COMSEC variety. Also, the system comprises at least one hosted communication security module on the vehicle to decrypt the encrypted hosted commands by utilizing at least one hosted COMSEC variety to produce unencrypted hosted commands. Additionally, the system comprises the payload on the vehicle to reconfigure according to the unencrypted hosted commands. In addition, the system comprises at least one hosted communication security module to encrypt unencrypted hosted payload telemetry by utilizing at least one hosted COMSEC variety to produce encrypted hosted telemetry. Further, the system comprises a payload antenna on the vehicle to transmit host payload data, hosted payload data, and the encrypted hosted telemetry to the secure enclave, which decrypts the encrypted hosted telemetry by utilizing at least one hosted COMSEC variety to produce the unencrypted hosted payload telemetry.

In one or more embodiments, vehicle is an airborne vehicle. In at least one embodiment, the airborne vehicle is a satellite, an aircraft, an unmanned aerial vehicle (UAV), or a space plane.

In at least one embodiment, a system for payload operations comprises a vehicle to receive encrypted host commands from a satellite operation portion of a host SOC. In one or more embodiments, the encrypted host commands are host commands encrypted by the satellite operation portion of the host SOC utilizing a host COMSEC variety. The system further comprises a host communication security module on the vehicle to decrypt the encrypted host commands by utilizing the host COMSEC variety to produce unencrypted host commands. Also, the system comprises a host payload on the vehicle to reconfigure according to the unencrypted host commands. In addition, the system comprises at least one hosted payload on the vehicle configured to be commanded on or off according to the unencrypted host commands. Additionally, the system comprises the host communication security module to encrypt unencrypted host payload telemetry by utilizing the host COMSEC variety to produce encrypted host telemetry. Also, the system comprises the vehicle to transmit the encrypted host telemetry to the satellite operation portion of the host SOC, which decrypts the encrypted host telemetry by utilizing the host COMSEC variety to produce the unencrypted host payload telemetry.

Also, the system comprises the vehicle to receive encrypted hosted commands from a secure enclave of the host SOC. In one or more embodiments, the encrypted hosted commands are hosted commands encrypted by the secure enclave by utilizing at least one hosted COMSEC variety. In addition, the system comprises at least one hosted communication security module on the vehicle to decrypt the encrypted hosted commands by utilizing at least one hosted COMSEC variety to produce unencrypted hosted commands. Additionally, the system comprises at least one hosted payload on the vehicle to reconfigure according to the unencrypted hosted commands. Also, the system comprises at least one hosted communication security module to encrypt unencrypted hosted payload telemetry by utilizing at least one hosted COMSEC variety to produce encrypted hosted telemetry. In addition, the system comprises a host payload antenna on the vehicle to transmit host payload data. Also, the system comprises a hosted payload antenna on the vehicle to transmit hosted payload data. Further, the system comprises the vehicle to transmit the encrypted hosted telemetry to the secure enclave, which decrypts the encrypted hosted telemetry by utilizing at least one hosted COMSEC variety to produce the unencrypted hosted payload telemetry.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 2 is a table showing a summary of the various different types of transmission of the host and hosted commands and telemetry that may be employed for the disclosed system of FIG. 1, in accordance with at least one embodiment of the present disclosure.

FIG. 4 is a table showing a summary of the various different types of transmission of the host and hosted commands and telemetry that may be employed for the disclosed system of FIG. 3, in accordance with at least one embodiment of the present disclosure.

FIG. 6 is a table showing a summary of the various different types of transmission of the host and hosted commands and telemetry that may be employed for the disclosed system of FIG. 5, in accordance with at least one embodiment of the present disclosure.

Figure 1:
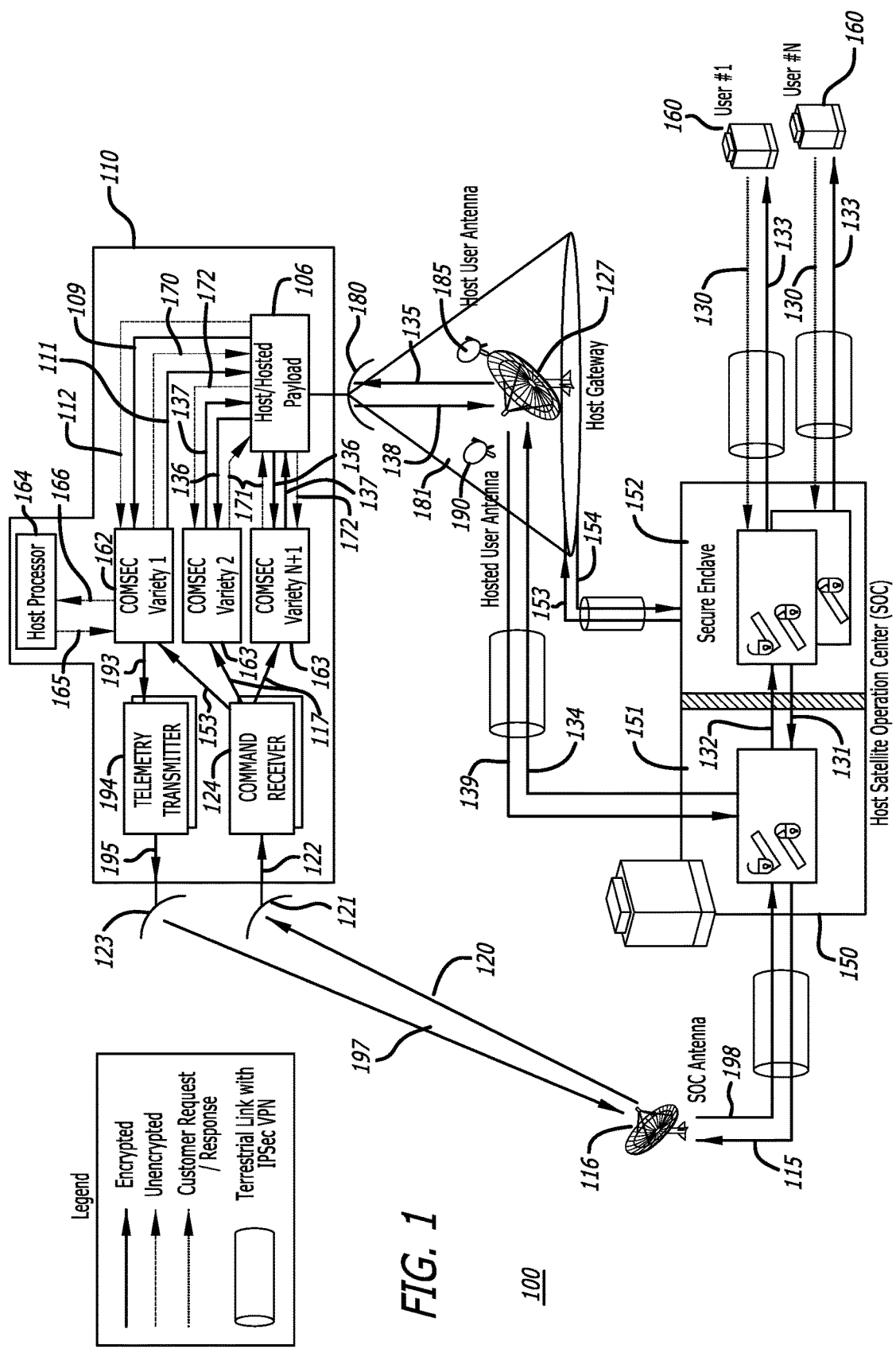
FIG. 1 is a diagram showing the disclosed system for satellite operations with a secure enclave for secure inband hosted payload operations for a combined host/hosted payload, in accordance with at least one embodiment of the present disclosure.
Figure 7A:
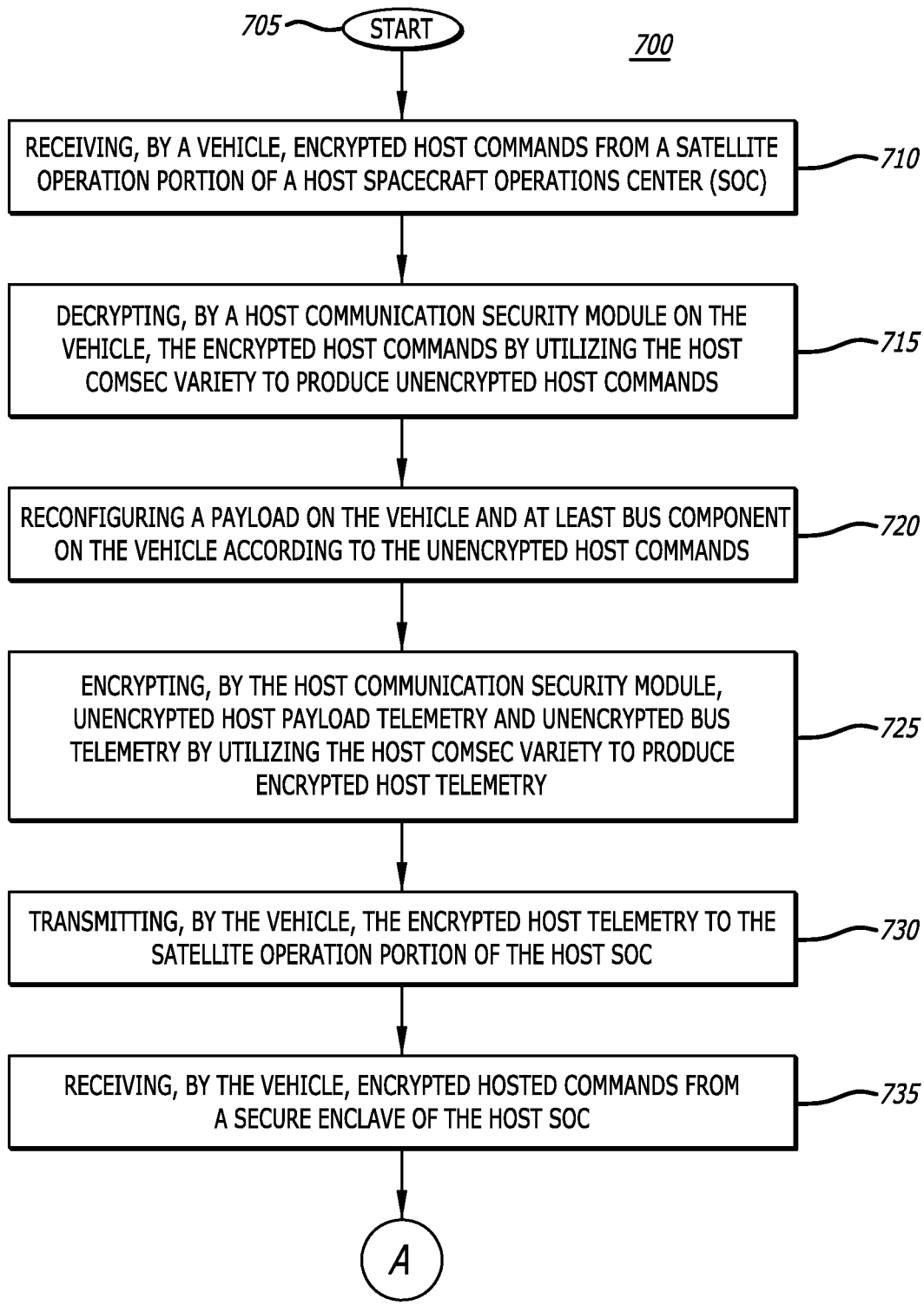
Figure 7B:
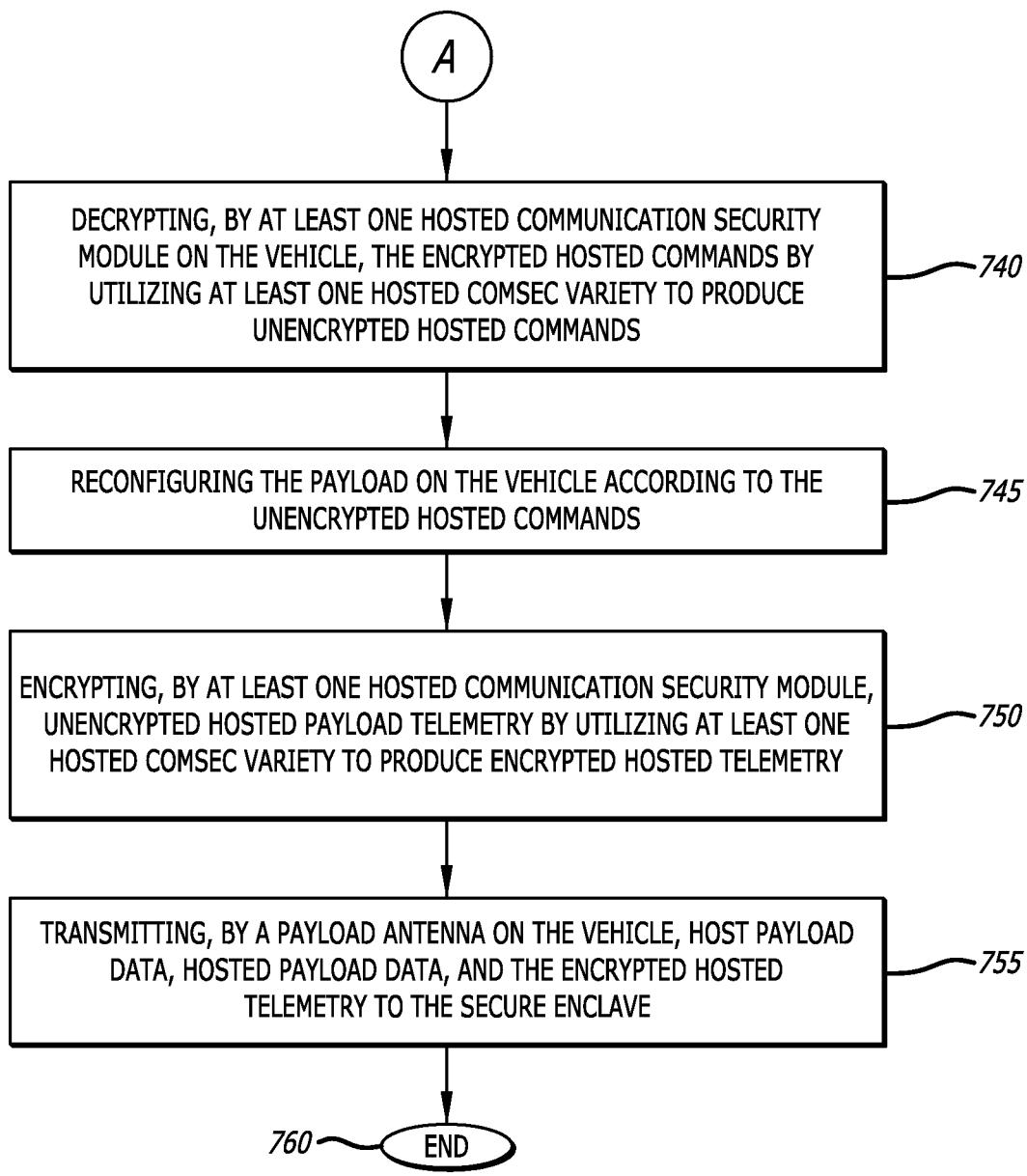

FIGS. 7A and 7B together show a flow chart for the disclosed method of operation of the disclosed system for satellite operations with a secure enclave for secure inband hosted payload operations for a combined host/hosted payload of FIG. 1, in accordance with at least one embodiment of the present disclosure.

Figure 3:
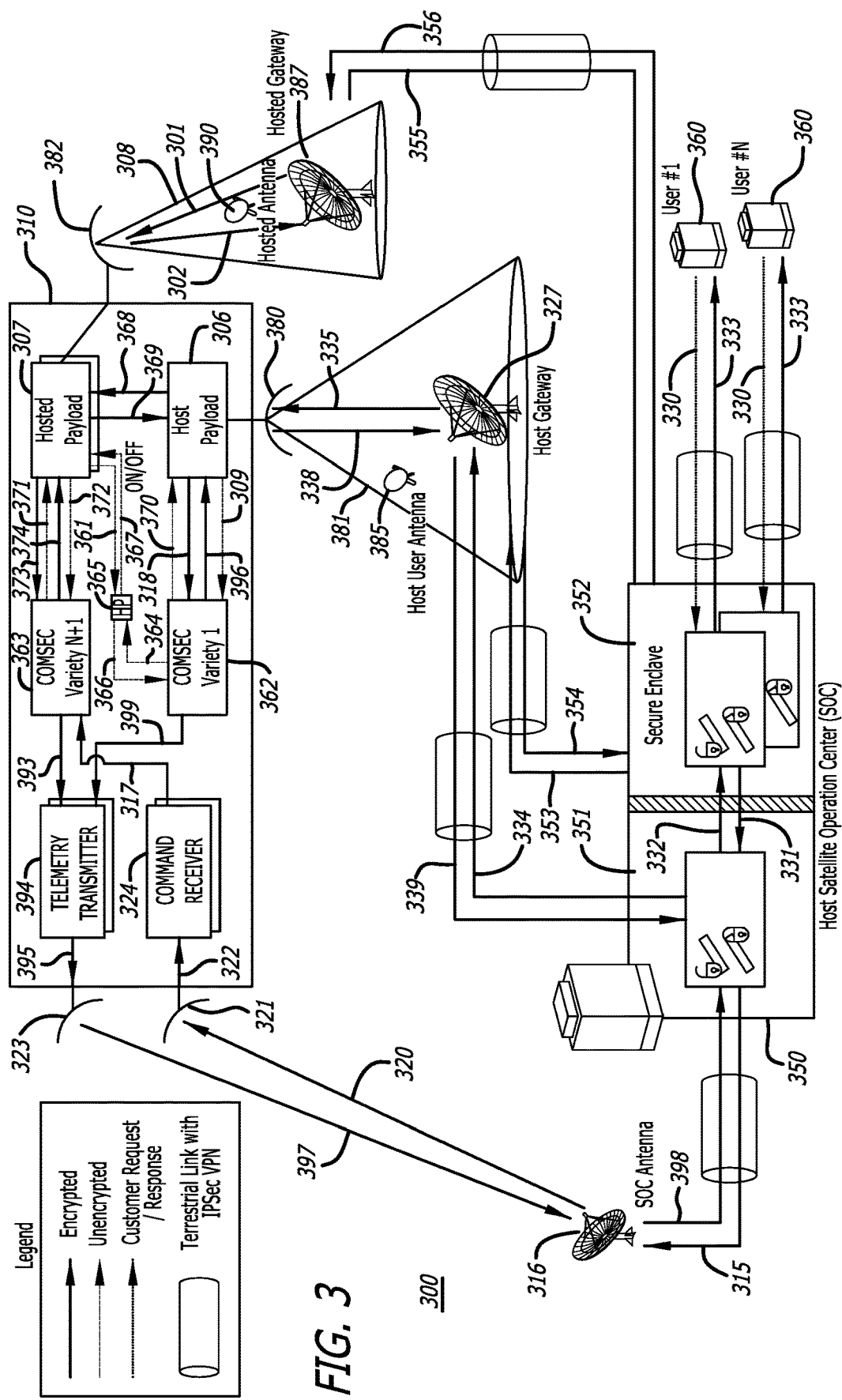
FIG. 3 is a diagram showing the disclosed system for satellite operations with a secure enclave for secure inband hosted payload operations for a hosted payload(s), where a satellite operation portion of a host SOC communicates using inband frequencies with a vehicle via a host payload antenna, in accordance with at least one embodiment of the present disclosure.
Figure 5:
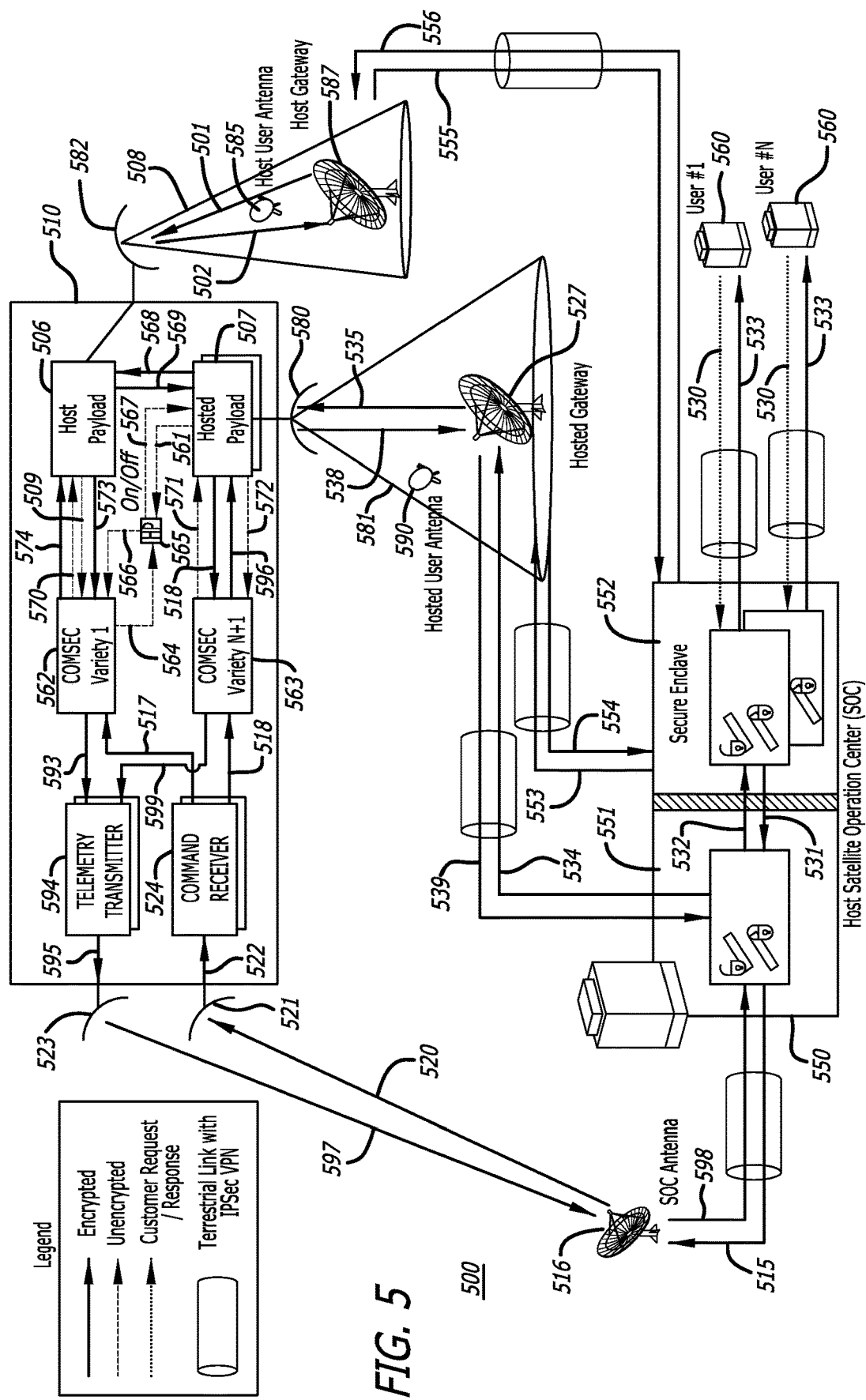
FIG. 5 is a diagram showing the disclosed system for satellite operations with a secure enclave for secure inband hosted payload operations for a hosted payload(s), where a satellite operation portion of a host SOC communicates using inband frequencies with a vehicle via a hosted payload antenna, in accordance with at least one embodiment of the present disclosure.
Figure 8A:
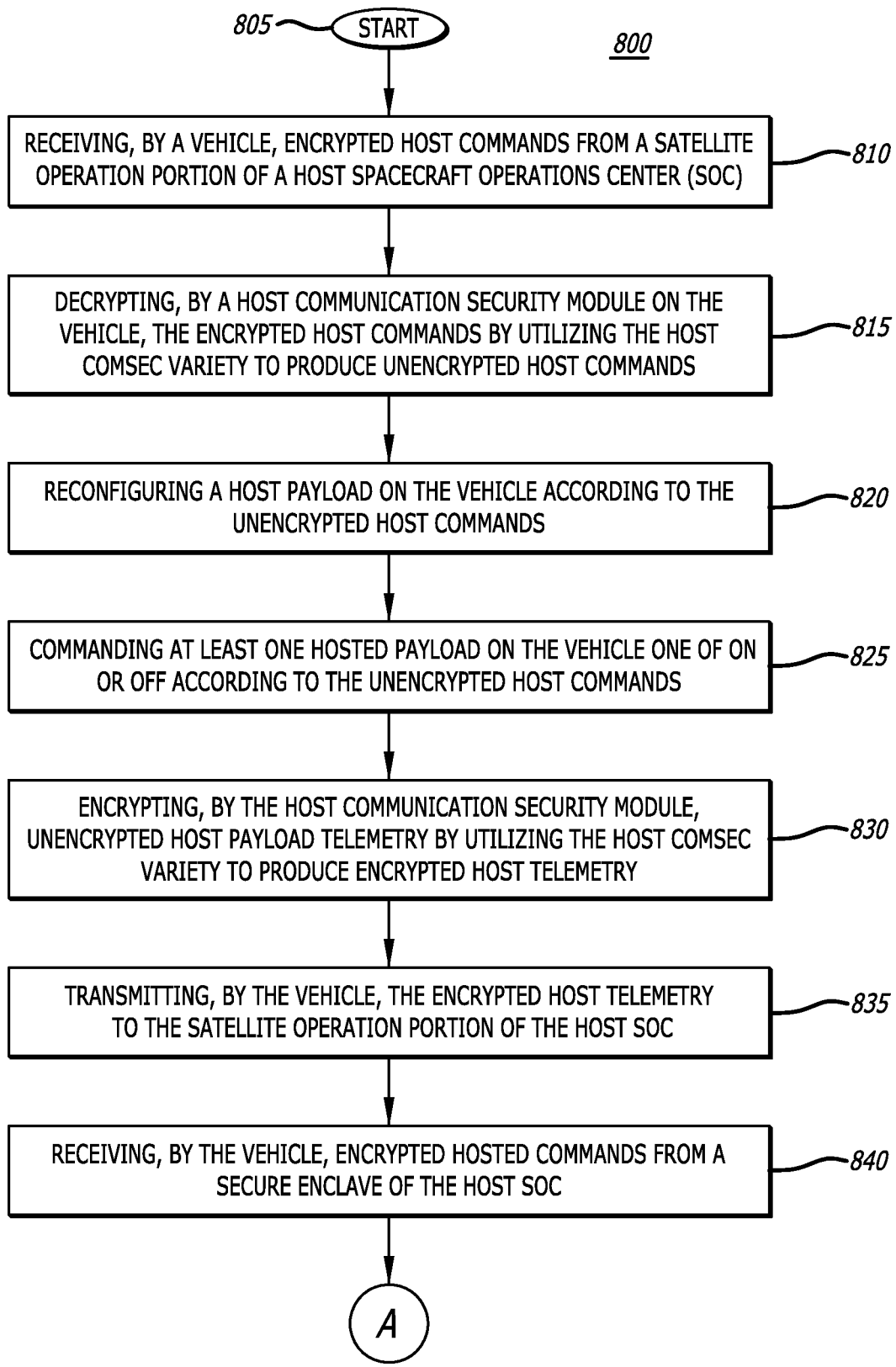
Figure 8B:
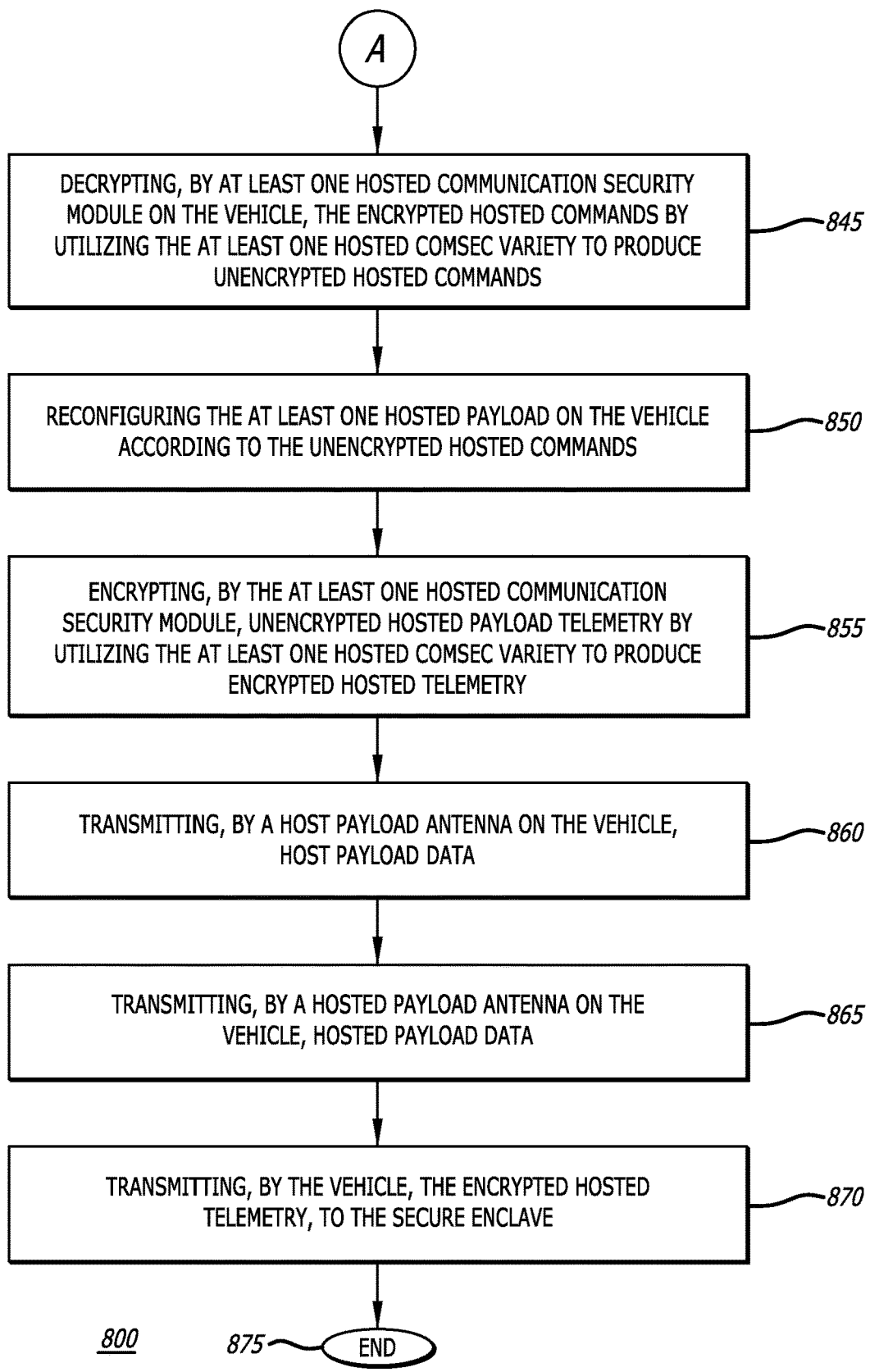

FIGS. 8A and 8B together show a flow chart for the disclosed method of operation of the disclosed systems for satellite operations with a secure enclave for secure inband hosted payload operations for a hosted payload(s) of FIGS. 3 and 5, in accordance with at least one embodiment of the present disclosure.

FIGS. 9A and 9B together show a table listing a number of various different communications scenarios that may be employed by the disclosed systems for satellite operations with a secure enclave for secure inband hosted payload operations of FIGS. 1, 3 and 5, in accordance with at least one embodiment of the present disclosure.

DESCRIPTION

The methods and apparatus disclosed herein provide an operative system for satellite operations with a secure enclave for secure inband hosted payload operations. In particular, the disclosed system employs a host satellite operation center (SOC) that separates the data processing (e.g., the commanding and telemetry) of the host user (e.g., host operator) and the hosted user(s) (e.g., hosted payload operator(s)) by utilizing a secure enclave and a host SOC satellite operation portion. The secure enclave portion is a secure portion of the host SOC that is utilized for the hosted user data processing, and allows for the hosted user(s) to maintain privacy of its data and operations from the host user. As such, the secure enclave provides full autonomous control of a portion (e.g., a hosted payload portion) of a shared payload (e.g., a host/hosted payload (e.g., refer to 106 of FIG. 1) or of at least one separate hosted payload (e.g., refer to 307 of FIG. 3 and 507 of FIG. 5) installed on a satellite. The host SOC arrangement does not allow for the host user to have any knowledge of the commanding or telemetry of the portion of a shared payload (e.g., a host/hosted payload) used by the hosted user(s) or of at least one separate hosted payload installed on a satellite used by hosted user(s). The host SOC satellite operation portion is utilized for the host user data processing, which remains private from the hosted user.

As previously mentioned above, currently, typical payload operations for a vehicle (e.g., a satellite) have the ability to perform switching of inputs to outputs of the payload on the vehicle. All of this switching on the payload is commanded and controlled by a single satellite controller with no resource allocation privacy. The disclosed system allows for private vehicle resource allocation and control that provides vehicle users the ability to privately, dynamically, allocate resources (e.g., a host/hosted payload, a host payload and/or a hosted payload) on demand.

The system of the present disclosure allows for vehicle operators to privately share vehicle resources by employing a secure enclave that is operated exclusively by the hosted payload operator(s), and by utilizing inband communications for the hosted (and/or host) commanding and/or hosted (and/or host) telemetry to and from the satellite. In one or more embodiments, the secure enclave and the host SOC are co-located. In some embodiments, the host SOC comprises the secure enclave (e.g., the secure enclave is located within the host SOC). For example, the secure enclave may comprise a secure compartmentalized area (e.g., a locked and/or guarded room or building) comprising secure isolated hardware (such as servers as well as encryptors and/or decryptors) located within (or proximate to) the host SOC (e.g., located within a building of the host SOC, or located on the campus of the host SOC). As such, the secure enclave may be a room located within a building of the host SOC facility, or may be a building located within the campus of the host SOC. In addition, for example, the secure enclave may be a portion of a room or building of the host SOC that is secure and compartmentalized by a physical partition(s), such as a fence or a wall within the room or building. The secure enclave operates separately and privately from the rest of the host SOC room, building, facility, or campus.

Access to the secure enclave is limited only to authorized persons. In one or more embodiments, the authorized persons are cleared to support the hosted payload(s) operations (including obtaining access to hosted telemetry and commands) of at least one hosted user. In one or more embodiments, the authorized persons are associated with (e.g., employed by) the hosted user(s). It should be noted that, in at least one embodiment, the authorized persons may be associated with (e.g., employed by) the host user, but supporting the hosted payload(s) operations for the hosted user(s). In one or more embodiments, the secure enclave operator may be the hosted user or, alternatively, may be the host user or a contractor hired by the host user.

Employing the secure enclave at the host SOC allows for separation and privacy of the hosted payload operator(s) activity and the host operator activity. The hosted payload operator(s) at the secure enclave may communicate directly to and/or from the hosted payload(s) on the satellite via inband communications and, as such, the hosted payload operation data may be transmitted and/or received to the exclusion of the host operator and/or network.

As previously mentioned, the secure enclave, operated by a hosted payload operator(s), is located within the host SOC. Although the secure enclave itself is located within the host SOC, the secure enclave operates as a hosted payload (HoP) operation center (HOC), which is operated privately and securely by the hosted payload operator(s). The secure enclave is secure within the host SOC and separately operated by the hosted payload operator(s) such that the host activity in the host SOC and the hosted activity in the host SOC remain separate and private from one another within the host SOC. Thus, all processing of data and/or operations within the secure enclave maintains privacy for the hosted payload operator(s). The secure enclave provides full autonomous control by the hosted payload operator(s) over the hosted payload(s) installed on the satellite. In one or more embodiments, the hosted telemetry, command and control, and/or sensor data are communicated via inband directly to and from the hosted payload operator(s) within the secure enclave, to the exclusion of the host operator, where no commands, telemetry, and/or data pass though the host operator network to or from the satellite.

It should be noted that the host/hosted payload (i.e. shared payload), the host payload and/or at least one hosted payload for the disclosed system for private vehicle resource allocation and control may employ various different types of transponders. For example, various different types of transponders may be employed including, but not limited to, various different types of digital transponders, various different types of analog transponders (e.g., conventional repeater-type transponders), and various different types of combination analog/digital transponders.

In addition, it should be noted that in this disclosure, "inband" frequency band(s) refer to a frequency band(s) that is the same frequency band(s) utilized to transmit payload data (e.g., host payload data and/or hosted payload data); and "out-of-band" frequency band(s) refer to a frequency band(s) that is not the same frequency band(s) utilized to transmit payload data (e.g., host payload data and/or hosted payload data). It should be noted that whenever the payload data (e.g., the host payload data and hosted payload data) is transmitted, the payload data is encrypted (e.g., encrypted host payload data and encrypted hosted payload data) for security purposes. Additionally, it should be noted that in the disclosed system, all commanding and telemetry can be performed by any combination of inband frequency band(s) and out-of-band frequency bands(s). Refer to the table of FIGS. 9A and 9B, which shows the possible combinations for the transmission (i.e. transmitted either out-of-band or inband (e.g., either via the host SOC or via the secure enclave) of the host commanding, host telemetry, hosted commanding, and hosted telemetry for the disclosed system.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to satellite communication systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1 is a diagram showing the disclosed system 100 for satellite operations with a secure enclave 152 for secure inband hosted payload operations for a combined host/hosted payload 106, in accordance with at least one embodiment of the present disclosure. In this figure, a vehicle 110 and a host satellite operations center (SOC) 150 are shown. The host SOC 150 is shown to comprise satellite operation portion 151, which is operated by a host user, and a separate secure enclave 152 portion, which is operated by at least one hosted user 160. In one or more embodiments, at least one hosted user 160 may be a contractor hired by the host user.

It should be noted that the satellite operation portion 151 and the secure enclave 152 portion may communicate (e.g., communicate host and hosted telemetry and commands) with the vehicle 110 by various different signal transmission paths and by utilizing various different frequencies (e.g., an inband frequency band(s) and/or an out-of-band frequency band(s)). For example, for the system 100 of FIG. 1, a summary of the various different signal transmission paths and various different frequencies of communication is shown in FIG. 2. In addition, it should be noted that the system 100 of FIG. 1, in one or more embodiments, may utilize (but is not limited to) scenario numbers 1, 5, 9, 13, 17, 21, and 23 of the table 900 shown in FIGS. 9A and 9B, which lists a number of various different communications scenarios that may be employed by the disclosed systems (including the system 100 of FIG. 1). Additionally, it should be noted that, although various signal transmission paths are depicted in FIG. 1, more or less signal transmission paths may be employed for the system 100 of FIG. 1 in order to accommodate different communications scenarios in table 900 of FIGS. 9A and 9B that may be employed by the system 100 of FIG. 1, but are not specifically shown in FIG. 1.

Various different types of vehicles may be employed for the vehicle 110 including, but not limited to, an airborne vehicle. And, various different types of airborne vehicles may be employed for the vehicle 110 including, but not limited to, a satellite (as shown in FIG. 1), an aircraft, an unmanned aerial vehicle (UAV), and a space plane. In the case of a satellite (as is FIG. 1) being employed for the vehicle 110, it should be noted that satellites typically include computer-controlled systems. A satellite generally includes a bus and a payload (e.g., a shared host/hosted payload 106). The bus may include systems (which include components) that control the satellite. These systems perform tasks, such as power generation and control, thermal control, telemetry, attitude control, orbit control, and other suitable operations.

The payload (e.g., a shared host/hosted payload) of the satellite provides functions to users of the satellite. The payload may include antennas, transponders, and other suitable devices. For example, with respect to communications, the payload in a satellite may be used to provide Internet access, telephone communications, radio, television, and/or other types of communications. Different entities may use the different portions of the shared payload 106 on the satellite. For example, a host user (e.g., an owner of the satellite) may utilize one portion of the host/hosted payload 106, and the host user may lease out different portions of the host/hosted payload 106 to a hosted user(s) 160 (e.g., a customer(s)) to use.

Leasing a portion of a payload(s) (e.g., a host/hosted payload 106) to a customer(s) (e.g., a hosted user(s)) may increase the revenues that an owner (e.g., the host user) of a satellite can obtain. Further, a customer may use a subset of the total resources in a satellite for a cost that is less than the cost for the customer to purchase and operate a satellite, to build and operate a satellite, or to lease an entire satellite.

During operation, the satellite operation portion 151 of the host SOC 150 generates unencrypted host commands according to service specifications for the host user. The host commands are commands that are used to configure the portion of the host/hosted payload 106 that is utilized by the host user. The various different types of service specifications that may be specified by the host user include, but are not limited to, regions of antenna coverage, effective isotropic radiation power (EIRP) for the antenna coverage, and a time period of when the antenna coverage is to occur. It should be noted that the host commands will never pass though the secure enclave 152 portion. Then, the satellite operation portion 151 encrypts the unencrypted host commands by utilizing a host communication security (COMSEC) variety (e.g., COMSEC variety 1) to produce encrypted host commands. It should be noted that the host COMSEC variety may include at least one encryption key and/or at least one algorithm (e.g., a Type 1 encryption algorithm or a Type 2 encryption algorithm).

The satellite operation portion 151 of the host SOC 150 then transmits the encrypted host commands to the vehicle 110. In one more embodiments, the satellite operation portion 151 of the host SOC 150 transmits the encrypted host commands to the vehicle 110 utilizing an out-of-band frequency band(s) (i.e. a frequency band(s) that is not the same frequency band(s) utilized to transmit payload data, such as host payload data) (e.g., refer to scenario A of table 200 of FIG. 2). In particular, for these embodiments, the satellite operation portion 151 of the host SOC 150 transmits 115 (via a secure terrestrial link with internet protocol security (IPSec) virtual private network (VPN)) the encrypted host commands to a ground SOC antenna 116. Then, the SOC antenna 116 transmits 120 the encrypted host commands to a command antenna 121 on the vehicle 110. The SOC antenna 116 transmits 120 the encrypted host commands utilizing an out-of-band frequency band(s) (i.e. a frequency band(s) that is not the same frequency band(s) utilized to transmit payload data, such as host payload data). The command antenna 121 on the vehicle 110 then transmits 122 the encrypted host commands to a command receiver 124. The command receiver 124 then transmits 153 the encrypted host commands to a host communication security module 162.

In other embodiments, the satellite operation portion 151 of the host SOC 150 transmits the encrypted host commands to the vehicle 110 utilizing an inband frequency band(s) (i.e. a frequency band(s) that is the same frequency band(s) utilized to transmit payload data, such as host payload data) (e.g., refer to scenario B of table 200 of FIG. 2). Specifically, for these embodiments, the satellite operation portion 151 of the host SOC 150 transmits 134 (via a secure terrestrial link with an IPSec VPN) the encrypted host commands to a ground gateway antenna 127 (e.g., a host gateway antenna). Then, the gateway antenna 127 transmits 135 the encrypted host commands to a payload antenna 180 on the vehicle 110. The gateway antenna 127 transmits 135 the encrypted host commands utilizing an inband frequency band(s) (i.e. a frequency band(s) that is the same frequency band(s) utilized to transmit payload data, such as host payload data). The payload antenna 180 transmits the encrypted host commands to a host/hosted payload 106. The host/hosted payload 106 then transmits 109 the encrypted host commands to a host communication security module 162.

After the host communication security module 162 receives the encrypted host commands, the host communication security module 162 decrypts the encrypted host commands utilizing the host COMSEC variety (e.g., COMSEC variety 1) to generate the unencrypted host commands.

It should be noted that the host communication security module 162 may comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security module 162 may comprise one or more processors.

Then, the host communication security module 162 transmits 166 the unencrypted host commands to a host (bus) processor 164. The host (bus) processor 164 reconfigures (e.g., by commanding) at least one bus component on the vehicle 110. Various different components on the bus of the vehicle 110 may be reconfigured by the host (bus) processor 164 including, but not limited to, batteries (e.g., including the charging and discharging of at least one of the batteries), heaters (e.g., including the turning "on" or "off" of at least one of the heaters to maintain a constant temperature on the vehicle 110), solar panels (e.g., including positioning at least one of the solar panels to increase efficiency of capturing sunlight), and propulsion systems (e.g., including commanding at least one of the propulsion units for positioning the vehicle 110 for station keeping the vehicle 110 within a specific orbital slot and/or location). After at least one bus component is reconfigured, the bus component(s) transmits bus telemetry to the host (bus) processor 164. The host (bus) processor 164 then generates unencrypted bus telemetry using the telemetry it received from the bus component(s), and transmits 165 the unencrypted bus telemetry to the host communication security module 162.

The host communication security module 162 also transmits 170 the unencrypted host commands to the host/hosted payload 106. The host/hosted payload 106 (e.g., the host payload portion of the host/hosted payload) is reconfigured according to the unencrypted host commands. The reconfiguring of the host/hosted payload 106 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, EIRP for at least one beam, transponder channels, or beam steering. Additionally, the reconfiguring of the host/hosted payload 106 may comprise reconfiguring at least one of: the payload antenna 180, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix. In one or more embodiments, the host/hosted payload comprises 106 one or more processors.

After the host/hosted payload 106 is reconfigured, the payload antenna 180 then supports (e.g., transmits in one or more antenna beams 181) host user data (e.g., host payload data) to a host user antenna 185 on the ground. It should be noted that in other embodiments, the host user antenna 185 may be airborne (e.g., located on an aircraft or satellite) or marine (e.g., located on a ship) rather than terrestrial (e.g., located on the ground) as is shown in FIG. 1.

Also, it should be noted that, although in FIG. 1, antenna beam 181 is shown to include a single circular spot beam. In other embodiments, the antenna beam 181 may include more than one beam as is shown in FIG. 1 (e.g., antenna beam 181 may include multiple beams, and antenna beam 181 may include beams of different shapes than the circular spot beam as is shown in FIG. 1 (e.g., antenna beam 181 may include elliptical beams and/or shaped beams of various different shapes)).

It should be noted that in one or more embodiments, the payload antenna 180 may comprise one or more reflector dishes including, but not limited to, parabolic reflectors and/or shaped reflectors. In addition, the payload antenna 180 may comprise one or more multifeed antenna arrays.

The host/hosted payload 106 transmits 112 unencrypted host telemetry (i.e. telemetry data related to the portion (e.g., host payload portion) of the host/hosted payload 106 that is utilized by the host user) to the host communication security module 162. The host communication security module 162 then encrypts the unencrypted host telemetry and the unencrypted bus telemetry utilizing the host COMSEC variety (i.e. COMESEC variety 1) to generate encrypted host telemetry.

The vehicle 110 then transmits the encrypted host telemetry to the satellite operation portion 151 of the host SOC 150. In one more embodiments, the vehicle 110 transmits the encrypted host telemetry to the satellite operation portion 151 of the host SOC 150 utilizing an out-of-band frequency band(s) (i.e. a frequency band(s) that is not the same frequency band(s) utilized to transmit payload data, such as host payload data) (e.g., refer to scenario C of table 200 of FIG. 2). In particular, for these embodiments, the host communication security module 162 transmits 193 the encrypted host telemetry to a telemetry transmitter 194. The telemetry transmitter 194 then transmits 195 the encrypted host telemetry to a telemetry antenna 123. The telemetry antenna 123 then transmits 197 the encrypted host telemetry to the SOC antenna 116. The telemetry antenna 123 transmits 197 the encrypted host telemetry utilizing an out-of-band frequency band(s) (i.e. a frequency band(s) that is not the same frequency band(s) utilized to transmit payload data). The SOC antenna 116 then transmits 198 (via a secure terrestrial link with IPSec VPN) the encrypted host telemetry to the satellite operation portion 151 of the host SOC 150. The satellite operation portion 151 then decrypts the encrypted host telemetry utilizing the host COMSEC variety (i.e. COMSEC variety 1) to generate the unencrypted host telemetry.

In other embodiments, the vehicle 110 transmits the encrypted host telemetry to the satellite operation portion 151 of the host SOC 150 utilizing an inband frequency band(s) (i.e. a frequency band(s) that is the same frequency band(s) utilized to transmit payload data, such as host payload data) (e.g., refer to scenario D of table 200 of FIG. 2). Specifically, for these embodiments, the host communication security module 162 transmits 111 the encrypted host telemetry to the host/hosted payload 106. The host/hosted payload 106 transmits the encrypted host telemetry to the payload antenna 180. The payload antenna 180 then transmits 138 the encrypted host telemetry to the gateway antenna (e.g., host gateway antenna) 127. The payload antenna 180 transmits the encrypted host telemetry utilizing an inband frequency band(s) (i.e. a frequency band(s) that is the same frequency band(s) utilized to transmit payload data, such as host payload data). The gateway antenna 127 then transmits 139 (via a secure terrestrial link with IPSec VPN) the encrypted host telemetry to the satellite operation portion 151 of the host SOC 150. The satellite operation portion 151 then decrypts the encrypted host telemetry utilizing the host COMSEC variety (i.e. COMSEC variety 1) to generate the unencrypted host telemetry.

In addition, during operation, hosted users 160 (e.g., N number of hosted users 160) transmit 130 (via a secure terrestrial link with IPSec VPN) requests to a secure enclave 152 of the host SOC 150, where each of the requests comprises service specifications for the hosted user associated with the request. The various different types of service specifications that may be transmitted include, but are not limited to, regions of antenna coverage, EIRP for the antenna coverage, and a time period of when the antenna coverage is to occur. For example, hosted user #1 160 may transmit 130 a request(s) comprising service specifications for specific regions on the Earth to receive antenna coverage (e.g., by specifying latitude and longitude coordinates, geocentric coordinates, and/or geodetic coordinates for the coverage region(s)), the lowest level of EIRP to be received for those regions for the antenna coverage, and a time period of when the antenna overage is to occur.

After the secure enclave 152 receives the requests, the secure enclave 152 generates unencrypted hosted commands for each of the requests according to the service specifications of the associated request. The hosted commands are commands that are used to configure each of the portions (e.g., hosted payload portions) of the host/hosted payload 106 that are utilized by the hosted users 160. Then, the secure enclave 152 encrypts the unencrypted hosted commands for each of the requests by utilizing a respective hosted communication security (COMSEC) variety for the hosted user associated with the request to produce encrypted hosted commands. As such, for each hosted user 160, a different hosted COMSEC variety will be utilized for the encryption of the hosted commands associated with that hosted user 160. It follows that for N number of hosted users 106, N number of hosted COMSEC varieties will be utilized to encrypt the hosted commands. However, it should be noted that for the encryption of the hosted user commands, COMSEC variety 2 to COMSEC variety N+1 will be utilized. For example, hosted commands associated with a request(s) from hosted user #1 160 will be encrypted with COMSEC variety 2, hosted commands associated with a request(s) from hosted user #2 160 will be encrypted with COMSEC variety 3, hosted commands associated with a request(s) from hosted user #3 160 will be encrypted with COMSEC variety 4, . . . and hosted commands associated with a request(s) from hosted user #N 160 will be encrypted with COMSEC variety N+1. It should be noted that the hosted COMSEC varieties may each include at least one encryption key and/or at least one algorithm (e.g., a Type 1 encryption algorithm or a Type 2 encryption algorithm).

Then, the secure enclave 152 transmits the encrypted hosted commands to the vehicle 110. In one more embodiments, the secure enclave 152 transmits the encrypted hosted commands to the vehicle 110 utilizing an out-of-band frequency band(s) (i.e. a frequency band(s) that is not the same frequency band(s) utilized to transmit payload data, such as hosted payload data) (e.g., refer to scenario E of table 200 of FIG. 2). Specifically, for these embodiments, the secure enclave 152 transmits 131 the encrypted hosted commands to the satellite operation portion 151 of the host SOC 150. The satellite operation portion 151 of the host SOC 150 then transmits 115 (via a secure terrestrial link with an IPSec VPN) the encrypted hosted commands to the ground SOC antenna 116. Then, the SOC antenna 116 transmits 120 the encrypted hosted commands to the command antenna 121 on the vehicle 110. The SOC antenna 116 transmits 120 the encrypted hosted commands utilizing an out-of-band frequency band(s) (i.e. a frequency band(s) that is not the same frequency band(s) utilized to transmit payload data, such as hosted payload data). The command antenna 121 on the vehicle 110 then transmits 122 the encrypted hosted commands to the command receiver 124. The command receiver 124 then transmits 117 the encrypted hosted commands to hosted communication security modules 163.

In other embodiments, the secure enclave 152 transmits the encrypted hosted commands to the vehicle 110 utilizing an inband frequency band(s) (i.e. a frequency band(s) that is the same frequency band(s) utilized to transmit payload data, such as hosted payload data) (e.g., refer to scenarios F and G of table 200 of FIG. 2). In particular, for some of these embodiments (e.g., for scenario F of table 200 of FIG. 2), the secure enclave 152 transmits 131 the encrypted hosted commands to the satellite operation portion 151 of the host SOC 150. The satellite operation portion 151 of the host SOC 150 transmits 134 (via a secure terrestrial link with internet protocol security (IPSec) virtual private network (VPN)) the encrypted hosted commands to the ground gateway antenna (e.g., a host gateway antenna) 127.

For other embodiments where the secure enclave 152 transmits the encrypted hosted commands to the vehicle 110 utilizing an inband frequency band(s) (e.g., for scenario G of table 200 of FIG. 2), the secure enclave 152 transmits 153 (via a secure terrestrial link with an IPSec VPN) the encrypted hosted commands directly to the ground gateway antenna (e.g., a host gateway antenna) 127.

Then, after the gateway antenna 127 receives the encrypted hosted commands, the gateway antenna 127 transmits 135 the encrypted hosted commands to the payload antenna 180 on the vehicle 110. The gateway antenna 127 transmits 135 the encrypted hosted commands utilizing an inband frequency band(s) (i.e. a frequency band(s) that is the same frequency band(s) utilized to transmit payload data, such as hosted payload data). The payload antenna 180 transmits the encrypted hosted commands to the host/hosted payload 106. The host/hosted payload 106 then transmits 136 the encrypted host commands to hosted communication security modules 163.

After the hosted communication security modules 163 receive the encrypted hosted commands, the hosted communication security modules 163 decrypt the encrypted hosted commands utilizing the hosted COMSEC varieties (e.g., COMSEC variety 2 to COMSEC variety N+1) to generate the unencrypted hosted commands.

It should be noted that the hosted communication security modules 163 may each comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security modules 163 may each comprise one or more processors.

the hosted communication security modules 163 then transmit 171 the unencrypted hosted commands to the host/hosted payload 106. The host/hosted payload 106 is reconfigured according to the unencrypted hosted commands (e.g., the hosted payload portion(s) of the host/hosted payload is reconfigured). The reconfiguring of the host/hosted payload 106 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, EIRP for at least one beam, transponder channels, or beam steering. Additionally, the reconfiguring of the host/hosted payload 106 may comprise reconfiguring at least one of: the payload antenna 180, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

After the host/hosted payload 106 is reconfigured, the payload antenna 180 then supports (e.g., transmits in one or more antenna beams 181) hosted user data (e.g., hosted payload data) to a hosted user antenna 190 on the ground. It should be noted that in other embodiments, the hosted user antenna 190 may be airborne (e.g., located on an aircraft or satellite) or marine (e.g., located on a ship) rather than terrestrial (e.g., located on the ground) as is shown in FIG. 1.

The host/hosted payload 106 then transmits 172 unencrypted hosted telemetry (i.e. telemetry data related to the portions of the host/hosted payload 106 that are utilized by the hosted users) to the hosted communication security modules 163. The hosted communication security modules 163 then encrypt the unencrypted hosted telemetry utilizing the hosted COMSEC varieties (i.e. COMSEC variety 2 to COMSEC variety N+1) to generate encrypted hosted telemetry. As such, for each hosted user 160, a different hosted COMSEC variety will be utilized for the encryption of the unencrypted hosted telemetry associated with that hosted user 160.

The hosted communication security modules 163 then transmit 137 the encrypted hosted telemetry to the host/hosted payload 106. The host/hosted payload 106 then transmits the encrypted hosted telemetry to the payload antenna 180. The payload antenna 180 transmits the encrypted hosted telemetry to the gateway antenna (e.g., host gateway antenna) 127. The payload antenna 180 transmits the encrypted hosted telemetry utilizing an inband frequency band(s) (i.e. a frequency band(s) that is the same frequency band(s) utilized to transmit payload data, such as hosted payload data) (e.g., refer to scenarios H and I of table 200 of FIG. 2). The gateway antenna 127 then transmits the encrypted hosted telemetry.

In some embodiments, the gateway antenna 127 transmits 139 (via a secure terrestrial link with IPSec VPN) the encrypted hosted telemetry to the satellite operation portion 151 of the host SOC 150 (e.g., refer to scenario H of table 200 of FIG. 2). The satellite operation portion 151 of the host SOC 150 then transmits 132 the encrypted hosted telemetry to the secure enclave.

In other embodiments, the gateway antenna 127 transmits 154 (via a secure terrestrial link with IPSec VPN) the encrypted hosted telemetry to the secure enclave 152 (e.g., refer to scenario I of table 200 of FIG. 2).

After the secure enclave 152 receives the encrypted hosted telemetry, the secure enclave 152 decrypts the encrypted hosted telemetry utilizing the hosted COMSEC varieties (e.g., COMSEC variety 2 to COMSEC variety N+1) to generate the unencrypted hosted telemetry. The secure enclave 152 then transmits 133 (via a secure terrestrial link with IPSec VPN) the unencrypted hosted telemetry respectively to the hosted users 160 that the unencrypted telemetry is associated.

It should be noted that, in one or more embodiments, the secure enclave 152 transmits 133 (via a secure terrestrial link with IPSec VPN) a confirmation to the hosted users 160 that their requests have been received and are being processed. In one or more embodiments, the secure enclave 152 subsequently transmits 133 (via a secure terrestrial link with IPSec VPN) a notification to the hosted users 160 that their requests have been satisfied (e.g., that the hosted payload portion of the host/hosted payload 106 has been reconfigured to satisfy the requests).

FIG. 2 is a table 200 showing a summary of the various different types of transmission of the host and hosted commands and telemetry that may be employed for the disclosed system 100 of FIG. 1, in accordance with at least one embodiment of the present disclosure. In particular, table 200 comprises a summary of the various different ways (e.g., scenarios A, B, C, D, E, F, G, H, and I) the host commands, host telemetry, hosted commands, and hosted telemetry may be transmitted to and from the vehicle. In particular, the host commands, host telemetry, and hosted commands may be transmitted utilizing either out-of-band or inband frequencies. In addition, the hosted commands, when transmitted utilizing inband frequencies, may be transmitted from the secure enclave via the host SOC (or not via the host SOC) to the vehicle. In addition, the hosted telemetry, when transmitted utilizing inband frequencies, may be transmitted from the vehicle via the host SOC (or not via the host SOC) to the secure enclave.

FIG. 3 is a diagram showing the disclosed system 300 for satellite operations with a secure enclave 352 for secure inband hosted payload operations for a hosted payload(s) 307, where a satellite operation portion 351 of a host SOC 350 communicates using inband frequencies with a vehicle 310 via a host payload antenna 380, in accordance with at least one embodiment of the present disclosure. In this figure, a vehicle 310 and a host SOC 350 are shown. The host SOC 350 is shown to comprise satellite operation portion 351, which is operated by a host user, and a separate secure enclave 352 portion, which is operated by at least one hosted user 360.

It should be noted that the satellite operation portion 351 and the secure enclave 352 portion may communicate (e.g., communicate host and hosted telemetry and commands) with the vehicle 310 by various different signal transmission paths and by utilizing various different frequencies (e.g., an inband frequency band(s) and/or an out-of-band frequency band(s)). For example, for the system 300 of FIG. 3, a summary of the various different signal transmission paths and various different frequencies of communication is shown in FIG. 4. In addition, it should be noted that the system 300 of FIG. 3, in one or more embodiments, may utilize (but is not limited to) scenario numbers 13-16, 25-32, and 45-48 of the table 900 shown in FIGS. 9A and 9B, which lists a number of various different communications scenarios that may be employed by the disclosed systems (including the system 300 of FIG. 3). Additionally, it should be noted that, although various signal transmission paths are depicted in FIG. 3, more or less signal transmission paths may be employed for the system 300 of FIG. 3 in order to accommodate different communications scenarios in table 900 of FIGS. 9A and 9B that may be employed by the system 300 of FIG. 3, but are not specifically shown in FIG. 3.

Various different types of vehicles may be employed for the vehicle 310 including, but not limited to, an airborne vehicle. And, various different types of airborne vehicles may be employed for the vehicle 310 including, but not limited to, a satellite (as shown in FIG. 3), an aircraft, an unmanned aerial vehicle (UAV), and a space plane. In the case of a satellite (as is FIG. 3) being employed for the vehicle 310, it should be noted that satellites typically include computer-controlled systems. A satellite generally includes a bus and a payload(s) (e.g., a host payload 306 and a hosted payload(s) 307). The bus may include systems (which include components) that control the satellite. These systems perform tasks, such as power generation and control, thermal control, telemetry, attitude control, orbit control, and other suitable operations.

The payload of the satellite provides functions to users of the satellite. The payload may include antennas, transponders, and other suitable devices. For example, with respect to communications, the payload in a satellite may be used to provide Internet access, telephone communications, radio, television, and/or other types of communications. Different entities may use the different payloads (i.e. the host payload 306 and the hosted payload(s) 307) on the satellite. For example, a host user (e.g., an owner of the satellite) may utilize the host payload 306, and the host user may lease out at least one hosted payload(s) 307 to hosted users 360 (e.g., customers) to use.

Leasing a payload(s) (e.g., a hosted payload(s) 307) to a customer(s) (e.g., a hosted user(s)) may increase the revenues that an owner (e.g., the host user) of a satellite can obtain. Further, a customer may use a subset of the total resources in a satellite for a cost that is less than the cost for the customer to purchase and operate a satellite, to build and operate a satellite, or to lease an entire satellite.

During operation, the satellite operation portion 351 of the host SOC 350 generates unencrypted host commands according to service specifications for the host user. The host commands are commands that are used to configure the host payload 306, which is utilized by the host user. The various different types of service specifications that may be specified by the host user include, but are not limited to, regions of antenna coverage, EIRP for the antenna coverage, and a time period of when the antenna coverage is to occur. It should be noted that the host commands will never pass though the secure enclave 352 portion. Then, the satellite operation portion 351 encrypts the unencrypted host commands by utilizing a host COMSEC variety (e.g., COMSEC variety 1) to produce encrypted host commands. It should be noted that the host COMSEC variety may include at least one encryption key and/or at least one algorithm (e.g., a Type 1 encryption algorithm or a Type 2 encryption algorithm).

The satellite operation portion 351 of the host SOC 350 then transmits the encrypted host commands to the vehicle 310. In one or more embodiments, the satellite operation portion 351 of the host SOC 350 transmits the encrypted host commands to the vehicle 310 utilizing an inband frequency band(s) (i.e. a frequency band(s) that is the same frequency band(s) utilized to transmit payload data, such as host payload data) (e.g., refer to scenario A of table 400 of FIG. 4). Specifically, for these embodiments, the satellite operation portion 351 of the host SOC 350 transmits 334 (via a secure terrestrial link with an IPSec VPN) the encrypted host commands to a ground gateway antenna 327 (e.g., a host gateway antenna 1). Then, the gateway antenna 327 transmits 335 the encrypted host commands to a host payload antenna 380 on the vehicle 310. The gateway antenna 327 transmits 335 the encrypted host commands utilizing an inband frequency band(s) (i.e. a frequency band(s) that is the same frequency band(s) utilized to transmit payload data, such as host payload data). The host payload antenna 380 transmits the encrypted host commands to a host payload 306. The host payload 306 then transmits 318 the encrypted host commands to a host communication security module 362. After the host communication security module 362 receives the encrypted host commands, the host communication security module 362 decrypts the encrypted host commands utilizing the host COMSEC variety (e.g., COMSEC variety 1) to generate the unencrypted host commands.

It should be noted that the host communication security module 362 may comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security module 362 may comprise one or more processors.

Then, the host communication security module 362 transmits 364 the unencrypted host commands to a host (bus) processor (HP) 365. The host (bus) processor 365 reconfigures (e.g., by commanding) at least one bus component on the vehicle 310. Various different components on the vehicle 310 may be reconfigured by the host (bus) processor 365 including, but not limited to, the hosted payload(s) 307 (e.g., including turning "on" or "off" at least one of the hosted payload(s) 307), batteries (e.g., including the charging and discharging of at least one of the batteries), heaters (e.g., including the turning "on" or "off" of at least one of the heaters to maintain a constant temperature on the vehicle 310), solar panels (e.g., including positioning at least one of the solar panels to increase efficiency of capturing sunlight), and propulsion systems (e.g., including commanding at least one of the propulsion units for positioning the vehicle 310 for station keeping the vehicle 310 within a specific orbital slot and/or location).

Then, the host (bus) processor (HP) 365 transmits 367 an on/off command to at least one hosted payload(s) 307 to command the hosted payload(s) 307 to turn "on" or "off". After at least one bus component (e.g., the hosted payload(s) 307) is reconfigured (e.g., turned "on" or "off"), the bus component(s) (e.g., the hosted payload(s) 307) transmits 361 bus telemetry to the host (bus) processor 365. The host (bus) processor 365 then generates unencrypted bus telemetry using the telemetry it received from the bus component(s), and transmits 366 the unencrypted bus telemetry to the host communication security module 362.

The host communication security module 362 also transmits 370 the unencrypted host commands to the host payload 306. The host payload 306 is reconfigured according to the unencrypted host commands. The reconfiguring of the host payload 306 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, EIRP for at least one beam, transponder channels, or beam steering. Additionally, the reconfiguring of the host payload 306 may comprise reconfiguring at least one of: a host payload antenna 380 (e.g., by steering the antenna), at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix. In one or more embodiments, the host payload 306 and/or the hosted payload(s) 307 comprise one or more processors.

After the host payload 306 is reconfigured, a host payload antenna 380 then supports (e.g., transmits in one or more antenna beams 381) host user data (e.g., host payload data) to a host user antenna 385 on the ground. It should be noted that in other embodiments, the host user antenna 385 may be airborne (e.g., located on an aircraft or satellite) or marine (e.g., located on a ship) rather than terrestrial (e.g., located on the ground) as is shown in FIG. 3.

Also, it should be noted that, although in FIG. 3, antenna beam 381 is shown to include a single circular spot beam; in other embodiments, the antenna beam 381 may include more than one beam as is shown in FIG. 3 (e.g., antenna beam 381 may include multiple beams, and antenna beam 381 may include beams of different shapes than the circular spot beam as is shown in FIG. 3 (e.g., antenna beam 381 may include elliptical beams and/or shaped beams of various different shapes).

It should be noted that in one or more embodiments, the host payload antenna 380 may comprise one or more reflector dishes including, but not limited to, parabolic reflectors and/or shaped reflectors. In addition, the host payload antenna 380 may comprise one or more multifeed antenna arrays.

After the host payload 306 is reconfigured, the host payload 306 transmits 309 unencrypted host telemetry (i.e. telemetry data related to the host payload 306 that is utilized by the host user) to the host communication security module 362. The host communication security module 362 then encrypts the unencrypted host telemetry and the unencrypted bus telemetry utilizing the host COMSEC variety (i.e. COMESEC variety 1) to generate encrypted host telemetry.

The vehicle 310 then transmits the encrypted host telemetry to the satellite operation portion 351 of the host SOC 350. In one more embodiments, the vehicle 310 transmits the encrypted host telemetry to the satellite operation portion 351 of the host SOC 350 utilizing an out-of-band frequency band(s) (i.e. a frequency band(s) that is not the same frequency band(s) utilized to transmit payload data, such as host payload data) (e.g., refer to scenario B of table 400 of FIG. 4). In particular, for these embodiments, the host communication security module 362 transmits 399 the encrypted host telemetry to a telemetry transmitter 394. The telemetry transmitter 394 then transmits 395 the encrypted host telemetry to a telemetry antenna 323. The telemetry antenna 323 then transmits 397 the encrypted host telemetry to a ground SOC antenna 316. The telemetry antenna 323 transmits 397 the encrypted host telemetry utilizing an out-of-band frequency band(s) (i.e. a frequency band(s) that is not the same frequency band(s) utilized to transmit payload data, such as host payload data). The SOC antenna 316 then transmits 398 (via a secure terrestrial link with IPSec VPN) the encrypted host telemetry to the satellite operation portion 351 of the host SOC 350. The satellite operation portion 351 of the host SOC 350 then decrypts the encrypted host telemetry utilizing the host COMSEC variety (i.e. COMSEC variety 1) to generate the unencrypted host telemetry.

In other embodiments, the vehicle 310 transmits the encrypted host telemetry to the satellite operation portion 351 of the host SOC 350 utilizing an inband frequency band(s) (i.e. a frequency band(s) that is the same frequency band(s) utilized to transmit payload data, such as host payload data) (e.g., refer to scenario C of table 400 of FIG. 4). Specifically, for these embodiments, the host communication security module 362 transmits 396 the encrypted host telemetry to the host payload 306. The host payload 306 transmits the encrypted host telemetry to the host payload antenna 380. The host payload antenna 380 then transmits 338 the encrypted host telemetry to the gateway antenna (e.g., host gateway antenna 1) 327. The host payload antenna 380 transmits the encrypted host telemetry utilizing an inband frequency band(s) (i.e. a frequency band(s) that is the same frequency band(s) utilized to transmit payload data, such as host payload data). The gateway antenna 327 then transmits 339 (via a secure terrestrial link with IPSec VPN) the encrypted host telemetry to the satellite operation portion 351 of the host SOC 350. The satellite operation portion 351 of the host SOC 350 then decrypts the encrypted host telemetry utilizing the host COMSEC variety (i.e. COMSEC variety 1) to generate the unencrypted host telemetry.

In addition, during operation, hosted users 360 (e.g., N number of hosted users 160) transmit 330 (via a secure terrestrial link with IPSec VPN) requests to a secure enclave 352 of the host SOC 350, where each of the requests comprises service specifications for the hosted user associated with the request. The various different types of service specifications that may be transmitted include, but are not limited to, regions of antenna coverage, EIRP for the antenna coverage, and a time period of when the antenna coverage is to occur. For example, hosted user #1 360 may transmit 330 a request(s) comprising service specifications for specific regions on the Earth to receive antenna coverage (e.g., by specifying latitude and longitude coordinates, geocentric coordinates, and/or geodetic coordinates for the coverage region(s)), the lowest level of EIRP to be received for those regions for the antenna coverage, and a time period of when the antenna overage is to occur.

After the secure enclave 352 receives the requests, the secure enclave 352 generates unencrypted hosted commands for each of the requests according to the service specifications of the associated request. The hosted commands are commands that are used to configure the hosted payload(s) 307 that are utilized by the hosted users 360. Then, the secure enclave 352 encrypts the unencrypted hosted commands for each of the requests by utilizing a respective hosted communication security (COMSEC) variety for the hosted user associated with the request to produce encrypted hosted commands. As such, for each hosted user 360, a different hosted COMSEC variety will be utilized for the encryption of the hosted commands associated with that hosted user 360. It follows that for N number of hosted users 360, N number of hosted COMSEC varieties will be utilized to encrypt the hosted commands. However, it should be noted that for the encryption of the hosted user commands, COMSEC variety 2 to COMSEC variety N+1 will be utilized. For example, hosted commands associated with a request(s) from hosted user #1 360 will be encrypted with COMSEC variety 2, hosted commands associated with a request(s) from hosted user #2 360 will be encrypted with COMSEC variety 3, hosted commands associated with a request(s) from hosted user #3 360 will be encrypted with COMSEC variety 4, . . . and hosted commands associated with a request(s) from hosted user #N 360 will be encrypted with COMSEC variety N+1. It should be noted that the hosted COMSEC varieties may each include at least one encryption key and/or at least one algorithm (e.g., a Type 1 encryption algorithm or a Type 2 encryption algorithm).

Then, the secure enclave 352 transmits the encrypted hosted commands to the vehicle 310. In one more embodiments, the secure enclave 352 transmits the encrypted hosted commands to the vehicle 310 utilizing an out-of-band frequency band(s) (i.e. a frequency band(s) that is not the same frequency band(s) utilized to transmit payload data, such as hosted payload data) (e.g., refer to scenario D of table 400 of FIG. 4). Specifically, for these embodiments, the secure enclave 352 transmits 331 the encrypted hosted commands to the satellite operation portion 351 of the host SOC 350. The satellite operation portion 351 of the host SOC 350 then transmits 315 (via a secure terrestrial link with an IPSec VPN) the encrypted hosted commands to the ground SOC antenna 316. Then, the SOC antenna 316 transmits 320 the encrypted hosted commands to the command antenna 321 on the vehicle 310. The SOC antenna 316 transmits 320 the encrypted hosted commands utilizing an out-of-band frequency band(s) (i.e. a frequency band(s) that is not the same frequency band(s) utilized to transmit payload data, such as hosted payload data). The command antenna 321 on the vehicle 310 then transmits 322 the encrypted hosted commands to the command receiver 324. The command receiver 324 then transmits 317 the encrypted hosted commands to hosted communication security modules 363.

In other embodiments, the secure enclave 352 transmits the encrypted hosted commands to the vehicle 310 utilizing an inband frequency band(s) (i.e. a frequency band(s) that is the same frequency band(s) utilized to transmit payload data, such as hosted payload data) (e.g., refer to scenarios E, F, and G of table 400 of FIG. 4). In particular, for some of these embodiments (e.g., for scenario E of table 400 of FIG. 4), the secure enclave 352 transmits 331 the encrypted hosted commands to the satellite operation portion 351 of the host SOC 350. The satellite operation portion 351 of the host SOC 350 transmits 334 (via a secure terrestrial link with IPSec VPN) the encrypted hosted commands to the ground gateway antenna (e.g., a host gateway antenna 1) 327.

For other embodiments where the secure enclave 352 transmits the encrypted hosted commands to the vehicle 310 utilizing an inband frequency band(s) (e.g., for scenario F of table 400 of FIG. 4), the secure enclave 352 transmits 353 (via a secure terrestrial link with an IPSec VPN) the encrypted hosted commands directly to the ground gateway antenna (e.g., a host gateway antenna 1) 327.

Then, after the gateway antenna 327 receives the encrypted hosted commands, the gateway antenna 327 transmits 335 the encrypted hosted commands to the host payload antenna 380 on the vehicle 310. The gateway antenna 327 transmits 335 the encrypted hosted commands utilizing an inband frequency band(s) (i.e. a frequency band(s) that is the same frequency band(s) utilized to transmit payload data, such as hosted payload data). The host payload antenna 380 transmits the encrypted hosted commands to the host payload 306. The host payload 306 then transmits (e.g., passes) 368 the encrypted hosted commands to the hosted payload(s) 307. The hosted payload(s) 307 transmits 373 the encrypted hosted commands to the hosted communication security modules 363.

In other embodiments, where the secure enclave 352 transmits the encrypted hosted commands to the vehicle 310 utilizing an inband frequency band(s) (e.g., for scenario G of table 400 of FIG. 4), the secure enclave 352 transmits 356 (via a secure terrestrial link with an IPSec VPN) the encrypted hosted commands directly to another ground gateway antenna (e.g., a hosted gateway antenna) 387.

Then, after the gateway antenna 387 receives the encrypted hosted commands, the gateway antenna 387 transmits 301 the encrypted hosted commands to the hosted payload antenna 382 on the vehicle 310. The gateway antenna 387 transmits 301 the encrypted hosted commands utilizing an inband frequency band(s) (i.e. a frequency band(s) that is the same frequency band(s) utilized to transmit payload data, such as hosted payload data). The hosted payload antenna 382 transmits the encrypted hosted commands to the hosted payload(s) 307. The hosted payload(s) 307 then transmits 373 the encrypted hosted commands to the hosted communication security modules 363.

After the hosted communication security modules 363 receive the encrypted hosted commands, the hosted communication security modules 363 decrypt the encrypted hosted commands utilizing the hosted COMSEC varieties (e.g., COMSEC variety 2 to COMSEC variety N+1) to generate the unencrypted hosted commands.

It should be noted that the hosted communication security modules 363 may each comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security modules 363 may each comprise one or more processors.

Then, the hosted communication security modules 363 transmit 371 the unencrypted hosted commands to the hosted payload(s) 307. The hosted payload(s) 307 is then reconfigured according to the unencrypted hosted commands. The reconfiguring of the hosted payload(s) 307 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, EIRP for at least one beam, transponder channels, or beam steering. Additionally, the reconfiguring of the hosted payload(s) 307 may comprise reconfiguring at least one of: the hosted payload antenna 382 (e.g., by steering the antenna), at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

After the hosted payload(s) 307 is reconfigured, the hosted payload antenna 382 then supports (e.g., transmits in one or more antenna beams 308) hosted user data (e.g., hosted payload data) to a hosted user antenna 390 on the ground. It should be noted that in other embodiments, the hosted user antenna 390 may be airborne (e.g., located on an aircraft or satellite) or marine (e.g., located on a ship) rather than terrestrial (e.g., located on the ground) as is shown in FIG. 3.

Also, it should be noted that, although in FIG. 3, antenna beam 308 is shown to include a single circular spot beam. In other embodiments, the antenna beam 308 may include more than one beam as is shown in FIG. 3 (e.g., antenna beam 308 may include multiple beams, and antenna beam 308 may include beams of different shapes than the circular spot beam as is shown in FIG. 3 (e.g., antenna beam 308 may include elliptical beams and/or shaped beams of various different shapes)).

It should be noted that in one or more embodiments, the hosted payload antenna 382 may comprise one or more reflector dishes including, but not limited to, parabolic reflectors and/or shaped reflectors. In addition, the hosted payload antenna 382 may comprise one or more multifeed antenna arrays.

After the hosted payload(s) 307 is reconfigured, the hosted payload(s) 307 transmits 372 unencrypted hosted telemetry (i.e. telemetry data related to the hosted payload(s) 307 that is utilized by the hosted user(s)) to the hosted communication security modules 363. The hosted communication security modules 363 then encrypt the unencrypted hosted telemetry utilizing the hosted COMSEC varieties (i.e. COMSEC variety 2 to COMSEC variety N+1) to generate encrypted hosted telemetry. As such, for each hosted user 360, a different hosted COMSEC variety will be utilized for the encryption of the unencrypted hosted telemetry associated with that hosted user 360.

The vehicle 310 transmits the encrypted hosted telemetry to the secure enclave 352. In one or more embodiments, the vehicle 310 transmits the encrypted hosted telemetry to the secure enclave 352 utilizing an out-of-band frequency band(s) (i.e. a frequency band(s) that is not the same frequency band(s) utilized to transmit payload data, such as hosted payload data) (e.g., refer to scenario H of table 400 of FIG. 4). Specifically, for these embodiments, the hosted communication security modules 363 transmit 393 the encrypted hosted telemetry to the telemetry transmitter 394. The telemetry transmitter 394 transmits 395 the encrypted hosted telemetry to the telemetry antenna 323. The telemetry antenna 323 transmits 397 the encrypted hosted telemetry to the SOC antenna 316. The telemetry antenna 323 transmits 397 the encrypted hosted telemetry utilizing an out-of-band frequency band(s) (i.e. a frequency band(s) that is not the same frequency band(s) utilized to transmit payload data, such as hosted payload data). The SOC antenna 316 transmits 398 the encrypted hosted telemetry (via a secure terrestrial link with an IPSec VPN) to the satellite operation portion 351 of the host SOC 350. The satellite operation portion 351 of the host SOC 350 transmits 332 the encrypted hosted telemetry to the secure enclave 352.

In other embodiments, the vehicle 310 transmits the encrypted hosted telemetry to the secure enclave 352 utilizing an inband frequency band(s) (i.e. a frequency band(s) that is the same frequency band(s) utilized to transmit payload data, such as hosted payload data) (e.g., refer to scenarios I, J, and K of table 400 of FIG. 4). In particular, for some of these embodiments (e.g., for scenario I of table 400 of FIG. 4), the hosted communication security modules 363 transmit 374 the encrypted hosted telemetry to the hosted payload(s) 307. The hosted payload(s) 307 then transmits (e.g., passes) 369 the encrypted hosted telemetry to the host payload 306. The host payload 306 then transmits the encrypted hosted telemetry to the host payload antenna 380. The host payload antenna 380 transmits the encrypted hosted telemetry to the gateway antenna (e.g., host gateway antenna 1) 327. The host payload antenna 380 transmits the encrypted hosted telemetry utilizing an inband frequency band(s) (i.e. a frequency band(s) that is the same frequency band(s) utilized to transmit payload data, such as hosted payload data). The gateway antenna 327 then transmits 339 (via a secure terrestrial link with IPSec VPN) the encrypted hosted telemetry to the satellite operation portion 351 of the host SOC 350. The satellite operation portion 351 transmits 332 the encrypted hosted telemetry to the secure enclave 352.

In other embodiments where the vehicle 310 transmits the encrypted hosted telemetry to the secure enclave 352 utilizing an inband frequency band(s) (e.g., for scenario J of table 400 of FIG. 4), the hosted communication security modules 363 transmit 374 the encrypted hosted telemetry to the hosted payload(s) 307. The hosted payload(s) 307 then transmits (e.g., passes) 369 the encrypted hosted telemetry to the host payload 306. The host payload 306 then transmits the encrypted hosted telemetry to the host payload antenna 380. The host payload antenna 380 transmits the encrypted hosted telemetry to the gateway antenna (e.g., host gateway antenna 1) 327. The host payload antenna 380 transmits the encrypted hosted telemetry utilizing an inband frequency band(s) (i.e. a frequency band(s) that is the same frequency band(s) utilized to transmit payload data, such as hosted payload data). The gateway antenna 327 then transmits 354 (via a secure terrestrial link with IPSec VPN) the encrypted hosted telemetry to the secure enclave 352.

In other embodiments where the vehicle 310 transmits the encrypted hosted telemetry to the secure enclave 352 utilizing an inband frequency band(s) (e.g., for scenario K of table 400 of FIG. 4), the hosted communication security modules 363 transmit 374 the encrypted hosted telemetry to the hosted payload(s) 307. The host payload(s) 307 then transmits the encrypted hosted telemetry to the hosted payload antenna 382. The hosted payload antenna 382 transmits 302 the encrypted hosted telemetry to the gateway antenna (e.g., hosted gateway antenna) 387. The hosted payload antenna 382 transmits 302 the encrypted hosted telemetry utilizing an inband frequency band(s) (i.e. a frequency band(s) that is the same frequency band(s) utilized to transmit payload data, such as hosted payload data). The gateway antenna 387 then transmits 355 (via a secure terrestrial link with IPSec VPN) the encrypted hosted telemetry to the secure enclave 352.

After the secure enclave 352 receives the encrypted hosted telemetry, the secure enclave 352 decrypts the encrypted hosted telemetry utilizing the hosted COMSEC varieties (e.g., COMSEC variety 2 to COMSEC variety N+1) to generate the unencrypted hosted telemetry. The secure enclave 352 then transmits 333 (via a secure terrestrial link with IPSec VPN) the unencrypted hosted telemetry respectively to the hosted users 360 that the unencrypted telemetry is associated.

It should be noted that, in one or more embodiments, the secure enclave 352 transmits 333 (via a secure terrestrial link with IPSec VPN) a confirmation to the hosted users 360 that their requests have been received and are being processed. In one or more embodiments, the secure enclave 352 subsequently transmits 333 (via a secure terrestrial link with IPSec VPN) a notification to the hosted users 360 that their requests have been satisfied (e.g., that the hosted payload(s) 307 has been reconfigured to satisfy the requests).

It should be noted that, in one or more embodiments, the gateway antenna 327 may be a host gateway antenna (i.e. a host owned gateway antenna) or a hosted gateway antenna (i.e. a hosted owned gateway antenna). And, in some embodiments, if the gateway antenna 327 is a host gateway antenna, the gateway antenna 327 will have a frequency band the same as the hosted frequency so that the gateway antenna 327 can communicate with the hosted payload.

Also, it should be noted that, in one or more embodiments, the gateway antenna 387 may be a host gateway antenna (i.e. a host owned gateway antenna) or a hosted gateway antenna (i.e. a hosted owned gateway antenna). And, in some embodiments, if the gateway antenna 387 is a host gateway antenna, the gateway antenna 387 will have a frequency band the same as the hosted frequency so that the gateway antenna 387 can communicate with the hosted payload.

FIG. 4 is a table 400 showing a summary of the various different types of transmission of the host and hosted commands and telemetry that may be employed for the disclosed system 300 of FIG. 3, in accordance with at least one embodiment of the present disclosure. In particular, table 400 comprises a summary of the various different ways (e.g., scenarios A, B, C, D, E, F, G, H, I, J, and K) the host commands, host telemetry, hosted commands, and hosted telemetry may be transmitted to and from the vehicle. In particular, the host commands may be transmitted utilizing inband frequencies. And, the host telemetry, hosted commands, and hosted telemetry may be transmitted utilizing either out-of-band or inband frequencies. In addition, the hosted commands, when transmitted utilizing inband frequencies, may be transmitted from the secure enclave via the host SOC (or not via the host SOC) and via a gateway antenna to the vehicle. Additionally, the hosted telemetry, when transmitted utilizing inband frequencies, may be transmitted from the vehicle via the host SOC (or not via the host SOC) and via a gateway antenna to the secure enclave.

FIG. 5 is a diagram showing the disclosed system 500 for satellite operations with a secure enclave 552 for secure inband hosted payload operations for a hosted payload(s) 507, where a satellite operation portion 551 of a host SOC 550 communicates using inband frequencies with a vehicle 510 via a hosted payload antenna 580, in accordance with at least one embodiment of the present disclosure. In this figure, a vehicle 510 and a host SOC 550 are shown. The host SOC 550 is shown to comprise satellite operation portion 551, which is operated by a host user, and a separate secure enclave 552 portion, which is operated by at least one hosted user 560. It should be noted that the system 500 of FIG. 5 is similar to the system 300 of FIG. 3 except that for the system 300 of FIG. 3, the satellite operation portion 351 communicates with the vehicle 310 (when utilizing an inband frequency band(s)) via the host payload antenna 380 and the host payload 306 and, conversely, for the system 500 of FIG. 5, the satellite operation portion 551 communicates with the vehicle 510 (when utilizing an inband frequency band(s)) via the hosted payload antenna 580 and the hosted payload(s) 507.

In addition, it should be noted that the satellite operation portion 551 and the secure enclave 552 portion may communicate (e.g., communicate host and hosted telemetry and commands) with the vehicle 510 by various different signal transmission paths and by utilizing various different frequencies (e.g., an inband frequency band(s) and/or an out-of-band frequency band(s)). For example, for the system 500 of FIG. 5, a summary of the various different signal transmission paths and various different frequencies of communication is shown in FIG. 6. In addition, it should be noted that the system 500 of FIG. 5, in one or more embodiments, may utilize (but is not limited to) scenario numbers 6-8, 10-12, 17, 18, 21, 22, 33-36, and 37-44 of the table 900 shown in FIGS. 9A and 9B, which lists a number of various different communications scenarios that may be employed by the disclosed systems (including the system 500 of FIG. 5). Additionally, it should be noted that, although various signal transmission paths are depicted in FIG. 5, more or less signal transmission paths may be employed for the system 500 of FIG. 5 in order to accommodate different communications scenarios in table 900 of FIGS. 9A and 9B that may be employed by the system 500 of FIG. 5, but are not specifically shown in FIG. 5.

Various different types of vehicles may be employed for the vehicle 510 including, but not limited to, an airborne vehicle. And, various different types of airborne vehicles may be employed for the vehicle 510 including, but not limited to, a satellite (as shown in FIG. 5), an aircraft, an unmanned aerial vehicle (UAV), and a space plane. In the case of a satellite (as is FIG. 5) being employed for the vehicle 510, it should be noted that satellites typically include computer-controlled systems. A satellite generally includes a bus and a payload(s) (e.g., a host payload 506 and a hosted payload(s) 507). The bus may include systems (which include components) that control the satellite. These systems perform tasks, such as power generation and control, thermal control, telemetry, attitude control, orbit control, and other suitable operations.

The payload of the satellite provides functions to users of the satellite. The payload may include antennas, transponders, and other suitable devices. For example, with respect to communications, the payload in a satellite may be used to provide Internet access, telephone communications, radio, television, and/or other types of communications. Different entities may use the different payloads (i.e. the host payload 506 and the hosted payload(s) 507) on the satellite. For example, a host user (e.g., an owner of the satellite) may utilize the host payload 506, and the host user may lease out at least one hosted payload(s) 507 to hosted users 560 (e.g., customers) to use.

Leasing a payload(s) (e.g., a hosted payload(s) 507) to a customer(s) (e.g., a hosted user(s)) may increase the revenues that an owner (e.g., the host user) of a satellite can obtain. Further, a customer may use a subset of the total resources in a satellite for a cost that is less than the cost for the customer to purchase and operate a satellite, to build and operate a satellite, or to lease an entire satellite.

During operation, the satellite operation portion 551 of the host SOC 550 generates unencrypted host commands according to service specifications for the host user. The host commands are commands that are used to configure the host payload 506, which is utilized by the host user. The various different types of service specifications that may be specified by the host user include, but are not limited to, regions of antenna coverage, EIRP for the antenna coverage, and a time period of when the antenna coverage is to occur. It should be noted that the host commands will never pass though the secure enclave 552 portion. Then, the satellite operation portion 551 encrypts the unencrypted host commands by utilizing a host COMSEC variety (e.g., COMSEC variety 1) to produce encrypted host commands. It should be noted that the host COMSEC variety may include at least one encryption key and/or at least one algorithm (e.g., a Type 1 encryption algorithm or a Type 2 encryption algorithm).

The satellite operation portion 551 of the host SOC 550 then transmits the encrypted host commands to the vehicle 510. In one more embodiments, the satellite operation portion 551 transmits the encrypted host commands to the vehicle 510 utilizing an out-of-band frequency band(s) (i.e. a frequency band(s) that is not the same frequency band(s) utilized to transmit payload data, such as host payload data) (e.g., refer to scenario A of table 600 of FIG. 6). Specifically, for these embodiments, the satellite operation portion 551 of the host SOC 550 transmits 515 (via a secure terrestrial link with an IPSec VPN) the encrypted host commands to the ground SOC antenna 516. Then, the SOC antenna 516 transmits 520 the encrypted host commands to the command antenna 521 on the vehicle 510. The SOC antenna 516 transmits 520 the encrypted host commands utilizing an out-of-band frequency band(s) (i.e. a frequency band(s) that is not the same frequency band(s) utilized to transmit payload data, such as host payload data). The command antenna 521 on the vehicle 510 then transmits 522 the encrypted host commands to the command receiver 524. The command receiver 524 then transmits 517 the encrypted host commands to host communication security module 562.

In other embodiments, the satellite operation portion 551 of the host SOC 550 transmits the encrypted host commands to the vehicle 510 utilizing an inband frequency band(s) (i.e. a frequency band(s) that is the same frequency band(s) utilized to transmit payload data, such as host payload data) (e.g., refer to scenario B of table 600 of FIG. 6). Specifically, for these embodiments, the satellite operation portion 551 of the host SOC 550 transmits 534 (via a secure terrestrial link with an IPSec VPN) the encrypted host commands to a ground gateway antenna 527 (e.g., a host gateway antenna 1). Then, the gateway antenna 527 transmits 535 the encrypted host commands to a hosted payload antenna 580 on the vehicle 510. The gateway antenna 527 transmits 535 the encrypted host commands utilizing an inband frequency band(s) (i.e. a frequency band(s) that is the same frequency band(s) utilized to transmit payload data, such as host payload data). The hosted payload antenna 580 transmits the encrypted host commands to a hosted payload(s) 507. The hosted payload(s) 507 transmits (e.g., passes) 568 the encrypted host commands to the host payload 506. The host payload 506 than transmits 573 the encrypted host commands to the host communication security module 562.

After the host communication security module 562 receives the encrypted host commands, the host communication security module 562 decrypts the encrypted host commands utilizing the host COMSEC variety (e.g., COMSEC variety 1) to generate the unencrypted host commands.

It should be noted that the host communication security module 562 may comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security module 362 may comprise one or more processors.

Then, the host communication security module 562 transmits 564 the unencrypted host commands to a host (bus) processor (HP) 565. The host (bus) processor 565 reconfigures (e.g., by commanding) at least one bus component on the vehicle 510. Various different components on the vehicle 510 may be reconfigured by the host (bus) processor 565 including, but not limited to, the hosted payload(s) 507 (e.g., including turning "on" or "off" at least one of the hosted payload(s) 507), batteries (e.g., including the charging and discharging of at least one of the batteries), heaters (e.g., including the turning "on" or "off" of at least one of the heaters to maintain a constant temperature on the vehicle 510), solar panels (e.g., including positioning at least one of the solar panels to increase efficiency of capturing sunlight), and propulsion systems (e.g., including commanding at least one of the propulsion units for positioning the vehicle 510 for station keeping the vehicle 510 within a specific orbital slot and/or location).

Then, the host (bus) processor (HP) 565 transmits 567 an on/off command to at least one hosted payload(s) 507 to command the hosted payload(s) 507 to turn "on" or "off". After at least one bus component (e.g., the hosted payload(s) 507) is reconfigured (e.g., turned "on" or "off"), the bus component(s) (e.g., the hosted payload(s) 507) transmits 561 bus telemetry to the host (bus) processor 565. The host (bus) processor 565 then generates unencrypted bus telemetry using the telemetry it received from the bus component(s), and transmits 566 the unencrypted bus telemetry to the host communication security module 562.

The host communication security module 562 also transmits 570 the unencrypted host commands to the host payload 506. The host payload 506 is reconfigured according to the unencrypted host commands. The reconfiguring of the host payload 506 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, EIRP for at least one beam, transponder channels, or beam steering. Additionally, the reconfiguring of the host payload 506 may comprise reconfiguring at least one of: a host payload antenna 582 (e.g., by steering the antenna), at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix. In one or more embodiments, the host payload 506 and/or the hosted payload(s) 507 comprise one or more processors.

After the host payload 506 is reconfigured, a host payload antenna 582 then supports (e.g., transmits in one or more antenna beams 508) host user data (e.g., host payload data) to a host user antenna 585 on the ground. It should be noted that in other embodiments, the host user antenna 585 may be airborne (e.g., located on an aircraft or satellite) or marine (e.g., located on a ship) rather than terrestrial (e.g., located on the ground) as is shown in FIG. 5.

Also, it should be noted that, although in FIG. 5, antenna beam 508 is shown to include a single circular spot beam; in other embodiments, the antenna beam 508 may include more than one beam as is shown in FIG. 5 (e.g., antenna beam 508 may include multiple beams, and antenna beam 508 may include beams of different shapes than the circular spot beam as is shown in FIG. 5 (e.g., antenna beam 508 may include elliptical beams and/or shaped beams of various different shapes).

It should be noted that in one or more embodiments, the host payload antenna 582 may comprise one or more reflector dishes including, but not limited to, parabolic reflectors and/or shaped reflectors. In addition, the host payload antenna 582 may comprise one or more multifeed antenna arrays.

After the host payload 506 is reconfigured, the host payload 506 transmits 509 unencrypted host telemetry (i.e. telemetry data related to the host payload 506 that is utilized by the host user) to the host communication security module 562. The host communication security module 562 then encrypts the unencrypted host telemetry and the unencrypted bus telemetry utilizing the host COMSEC variety (i.e. COMESEC variety 1) to generate encrypted host telemetry.

The vehicle 510 then transmits the encrypted host telemetry to the satellite operation portion 551 of the host SOC 550. In one more embodiments, the vehicle 510 transmits the encrypted host telemetry to the satellite operation portion 551 of the host SOC 550 utilizing an out-of-band frequency band(s) (i.e. a frequency band(s) that is not the same frequency band(s) utilized to transmit payload data, such as host payload data) (e.g., refer to scenario C of table 600 of FIG. 6). In particular, for these embodiments, the host communication security module 562 transmits 593 the encrypted host telemetry to a telemetry transmitter 594. The telemetry transmitter 594 then transmits 595 the encrypted host telemetry to a telemetry antenna 523. The telemetry antenna 523 then transmits 597 the encrypted host telemetry to a ground SOC antenna 516. The telemetry antenna 523 transmits 597 the encrypted host telemetry utilizing an out-of-band frequency band(s) (i.e. a frequency band(s) that is not the same frequency band(s) utilized to transmit payload data, such as host payload data). The SOC antenna 516 then transmits 598 (via a secure terrestrial link with IPSec VPN) the encrypted host telemetry to the satellite operation portion 551 of the host SOC 550. The satellite operation portion 551 of the host SOC 550 then decrypts the encrypted host telemetry utilizing the host COMSEC variety (i.e. COMSEC variety 1) to generate the unencrypted host telemetry.

In other embodiments, the vehicle 510 transmits the encrypted host telemetry to the satellite operation portion 551 of the host SOC 550 utilizing an inband frequency band(s) (i.e. a frequency band(s) that is the same frequency band(s) utilized to transmit payload data, such as host payload data) (e.g., refer to scenario D of table 600 of FIG. 6). Specifically, for these embodiments, the host communication security module 562 transmits 574 the encrypted host telemetry to the host payload 506. The host payload 506 transmits (e.g., passes) 569 the encrypted host telemetry to the hosted payload(s) 507. The hosted payload(s) 507 transmits the encrypted host telemetry to the hosted payload antenna 580. The hosted payload antenna 580 then transmits 538 the encrypted host telemetry to the gateway antenna (e.g., host gateway antenna 1) 527. The hosted payload antenna 580 transmits the encrypted host telemetry utilizing an inband frequency band(s) (i.e. a frequency band(s) that is the same frequency band(s) utilized to transmit payload data, such as host payload data). The gateway antenna 527 then transmits 539 (via a secure terrestrial link with IPSec VPN) the encrypted host telemetry to the satellite operation portion 551 of the host SOC 550. The satellite operation portion 551 of the host SOC 550 then decrypts the encrypted host telemetry utilizing the host COMSEC variety (i.e. COMSEC variety 1) to generate the unencrypted host telemetry.

In addition, during operation, hosted users 560 (e.g., N number of hosted users 160) transmit 530 (via a secure terrestrial link with IPSec VPN) requests to a secure enclave 552 of the host SOC 550, where each of the requests comprises service specifications for the hosted user associated with the request. The various different types of service specifications that may be transmitted include, but are not limited to, regions of antenna coverage, EIRP for the antenna coverage, and a time period of when the antenna coverage is to occur. For example, hosted user #1 560 may transmit 530 a request(s) comprising service specifications for specific regions on the Earth to receive antenna coverage (e.g., by specifying latitude and longitude coordinates, geocentric coordinates, and/or geodetic coordinates for the coverage region(s)), the lowest level of EIRP to be received for those regions for the antenna coverage, and a time period of when the antenna overage is to occur.

After the secure enclave 552 receives the requests, the secure enclave 552 generates unencrypted hosted commands for each of the requests according to the service specifications of the associated request. The hosted commands are commands that are used to configure the hosted payload(s) 507 that are utilized by the hosted users 560. Then, the secure enclave 552 encrypts the unencrypted hosted commands for each of the requests by utilizing a respective hosted communication security (COMSEC) variety for the hosted user associated with the request to produce encrypted hosted commands. As such, for each hosted user 560, a different hosted COMSEC variety will be utilized for the encryption of the hosted commands associated with that hosted user 560. It follows that for N number of hosted users 560, N number of hosted COMSEC varieties will be utilized to encrypt the hosted commands. However, it should be noted that for the encryption of the hosted user commands, COMSEC variety 2 to COMSEC variety N+1 will be utilized. For example, hosted commands associated with a request(s) from hosted user #1 560 will be encrypted with COMSEC variety 2, hosted commands associated with a request(s) from hosted user #2 560 will be encrypted with COMSEC variety 3, hosted commands associated with a request(s) from hosted user #3 560 will be encrypted with COMSEC variety 4, . . . and hosted commands associated with a request(s) from hosted user #N 560 will be encrypted with COMSEC variety N+1. It should be noted that the hosted COMSEC varieties may each include at least one encryption key and/or at least one algorithm (e.g., a Type 1 encryption algorithm or a Type 2 encryption algorithm).

Then, the secure enclave 552 transmits the encrypted hosted commands to the vehicle 510. In one more embodiments, the secure enclave 552 transmits the encrypted hosted commands to the vehicle 510 utilizing an out-of-band frequency band(s) (i.e. a frequency band(s) that is not the same frequency band(s) utilized to transmit payload data, such as hosted payload data) (e.g., refer to scenario E of table 600 of FIG. 6). Specifically, for these embodiments, the secure enclave 552 transmits 531 the encrypted hosted commands to the satellite operation portion 551 of the host SOC 550. The satellite operation portion 551 of the host SOC 550 then transmits 515 (via a secure terrestrial link with an IPSec VPN) the encrypted hosted commands to the ground SOC antenna 516. Then, the SOC antenna 516 transmits 520 the encrypted hosted commands to the command antenna 521 on the vehicle 510. The SOC antenna 516 transmits 520 the encrypted hosted commands utilizing an out-of-band frequency band(s) (i.e. a frequency band(s) that is not the same frequency band(s) utilized to transmit payload data, such as hosted payload data). The command antenna 521 on the vehicle 510 then transmits 522 the encrypted hosted commands to the command receiver 524. The command receiver 524 then transmits 518 the encrypted hosted commands to hosted communication security modules 563.

In other embodiments, the secure enclave 552 transmits the encrypted hosted commands to the vehicle 510 utilizing an inband frequency band(s) (i.e. a frequency band(s) that is the same frequency band(s) utilized to transmit payload data, such as hosted payload data) (e.g., refer to scenarios F, G, and H of table 600 of FIG. 6). In particular, for some of these embodiments (e.g., for scenario F of table 600 of FIG. 6), the secure enclave 552 transmits 531 the encrypted hosted commands to the satellite operation portion 551 of the host SOC 550. The satellite operation portion 551 of the host SOC 550 transmits 534 (via a secure terrestrial link with IPSec VPN) the encrypted hosted commands to the ground gateway antenna (e.g., a host gateway antenna 1) 527.

For other embodiments where the secure enclave 552 transmits the encrypted hosted commands to the vehicle 510 utilizing an inband frequency band(s) (e.g., for scenario G of table 600 of FIG. 6), the secure enclave 552 transmits 553 (via a secure terrestrial link with an IPSec VPN) the encrypted hosted commands directly to the ground gateway antenna (e.g., a host gateway antenna 1) 527.

Then, after the gateway antenna 527 receives the encrypted hosted commands, the gateway antenna 527 transmits 535 the encrypted hosted commands to the hosted payload antenna 580 on the vehicle 510. The gateway antenna 527 transmits 535 the encrypted hosted commands utilizing an inband frequency band(s) (i.e. a frequency band(s) that is the same frequency band(s) utilized to transmit payload data, such as hosted payload data). The hosted payload antenna 580 transmits the encrypted hosted commands to the hosted payload(s) 507. The hosted payload(s) 507 transmits 518 the encrypted hosted commands to the hosted communication security modules 563.

In other embodiments, where the secure enclave 552 transmits the encrypted hosted commands to the vehicle 510 utilizing an inband frequency band(s) (e.g., for scenario H of table 600 of FIG. 6), the secure enclave 552 transmits 556 (via a secure terrestrial link with an IPSec VPN) the encrypted hosted commands directly to another ground gateway antenna (e.g., a hosted gateway antenna) 587.

Then, after the gateway antenna 587 receives the encrypted hosted commands, the gateway antenna 587 transmits 501 the encrypted hosted commands to the host payload antenna 582 on the vehicle 510. The gateway antenna 587 transmits 501 the encrypted hosted commands utilizing an inband frequency band(s) (i.e. a frequency band(s) that is the same frequency band(s) utilized to transmit payload data, such as hosted payload data). The host payload antenna 582 transmits the encrypted hosted commands to the host payload 506. The host payload 506 then transmits (e.g., passes) 569 the encrypted hosted commands to the hosted payload(s) 507. The hosted payload(s) 507 then transmits 518 the encrypted hosted commands to the hosted communication security modules 563.

After the hosted communication security modules 563 receive the encrypted hosted commands, the hosted communication security modules 563 decrypt the encrypted hosted commands utilizing the hosted COMSEC varieties (e.g., COMSEC variety 2 to COMSEC variety N+1) to generate the unencrypted hosted commands.

It should be noted that the hosted communication security modules 563 may each comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security modules 563 may each comprise one or more processors.

Then, the hosted communication security modules 563 transmit 571 the unencrypted hosted commands to the hosted payload(s) 507. The hosted payload(s) 507 is then reconfigured according to the unencrypted hosted commands. The reconfiguring of the hosted payload(s) 507 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, EIRP for at least one beam, transponder channels, or beam steering. Additionally, the reconfiguring of the hosted payload(s) 507 may comprise reconfiguring at least one of: the hosted payload antenna 580 (e.g., by steering the antenna), at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

After the hosted payload(s) 507 is reconfigured, the hosted payload antenna 580 then supports (e.g., transmits in one or more antenna beams 581) hosted user data (e.g., hosted payload data) to a hosted user antenna 590 on the ground. It should be noted that in other embodiments, the hosted user antenna 590 may be airborne (e.g., located on an aircraft or satellite) or marine (e.g., located on a ship) rather than terrestrial (e.g., located on the ground) as is shown in FIG. 5.

Also, it should be noted that, although in FIG. 5, antenna beam 581 is shown to include a single circular spot beam; in other embodiments, the antenna beam 581 may include more than one beam as is shown in FIG. 5 (e.g., antenna beam 508 may include multiple beams, and antenna beam 581 may include beams of different shapes than the circular spot beam as is shown in FIG. 5 (e.g., antenna beam 581 may include elliptical beams and/or shaped beams of various different shapes).

It should be noted that in one or more embodiments, the hosted payload antenna 580 may comprise one or more reflector dishes including, but not limited to, parabolic reflectors and/or shaped reflectors. In addition, the hosted payload antenna 580 may comprise one or more multifeed antenna arrays.

After the hosted payload(s) 507 is reconfigured, the hosted payload(s) 507 transmits 572 unencrypted hosted telemetry (i.e. telemetry data related to the hosted payload(s) 507 that is utilized by the hosted user(s)) to the hosted communication security modules 563. The hosted communication security modules 563 then encrypt the unencrypted hosted telemetry utilizing the hosted COMSEC varieties (i.e. COMSEC variety 2 to COMSEC variety N+1) to generate encrypted hosted telemetry. As such, for each hosted user 560, a different hosted COMSEC variety will be utilized for the encryption of the unencrypted hosted telemetry associated with that hosted user 560.

The vehicle 510 transmits the encrypted hosted telemetry to the secure enclave 552. In one or more embodiments, the vehicle 510 transmits the encrypted hosted telemetry to the secure enclave 552 utilizing an out-of-band frequency band(s) (i.e. a frequency band(s) that is not the same frequency band(s) utilized to transmit payload data, such as hosted payload data) (e.g., refer to scenario I of table 600 of FIG. 6). Specifically, for these embodiments, the hosted communication security modules 563 transmit 599 the encrypted hosted telemetry to the telemetry transmitter 594. The telemetry transmitter 594 transmits 595 the encrypted hosted telemetry to the telemetry antenna 523. The telemetry antenna 523 transmits 597 the encrypted hosted telemetry to the SOC antenna 516. The telemetry antenna 523 transmits 597 the encrypted hosted telemetry utilizing an out-of-band frequency band(s) (i.e. a frequency band(s) that is not the same frequency band(s) utilized to transmit payload data, such as hosted payload data). The SOC antenna 516 transmits 598 the encrypted hosted telemetry (via a secure terrestrial link with an IPSec VPN) to the satellite operation portion 551 of the host SOC 550. The satellite operation portion 551 of the host SOC 550 transmits 532 the encrypted hosted telemetry to the secure enclave 552.

In other embodiments, the vehicle 510 transmits the encrypted hosted telemetry to the secure enclave 552 utilizing an inband frequency band(s) (i.e. a frequency band(s) that is the same frequency band(s) utilized to transmit payload data, such as hosted payload data) (e.g., refer to scenarios J, K, and L of table 600 of FIG. 6). In particular, for some of these embodiments (e.g., for scenario J of table 600 of FIG. 6), the hosted communication security modules 563 transmit 596 the encrypted hosted telemetry to the hosted payload(s) 507. The hosted payload(s) 507 then transmits the encrypted hosted telemetry to the hosted payload antenna 580. The hosted payload antenna 580 transmits 538 the encrypted hosted telemetry to the gateway antenna (e.g., host gateway antenna 1) 527. The hosted payload antenna 580 transmits the encrypted hosted telemetry utilizing an inband frequency band(s) (i.e. a frequency band(s) that is the same frequency band(s) utilized to transmit payload data, such as hosted payload data). The gateway antenna 527 then transmits 539 (via a secure terrestrial link with IPSec VPN) the encrypted hosted telemetry to the satellite operation portion 551 of the host SOC 550. The satellite operation portion 551 transmits 532 the encrypted hosted telemetry to the secure enclave 552.

In other embodiments where the vehicle 510 transmits the encrypted hosted telemetry to the secure enclave 552 utilizing an inband frequency band(s) (e.g., for scenario K of table 600 of FIG. 6), the hosted communication security modules 563 transmit 596 the encrypted hosted telemetry to the hosted payload(s) 507. The hosted payload(s) 507 then transmits the encrypted hosted telemetry to the hosted payload antenna 580. The hosted payload antenna 580 transmits 538 the encrypted hosted telemetry to the gateway antenna (e.g., host gateway antenna 1) 527. The hosted payload antenna 580 transmits the encrypted hosted telemetry utilizing an inband frequency band(s) (i.e. a frequency band(s) that is the same frequency band(s) utilized to transmit payload data, such as hosted payload data). The gateway antenna 527 then transmits 554 (via a secure terrestrial link with IPSec VPN) the encrypted hosted telemetry to the secure enclave 552.

In other embodiments where the vehicle 510 transmits the encrypted hosted telemetry to the secure enclave 552 utilizing an inband frequency band(s) (e.g., for scenario L of table 600 of FIG. 6), the hosted communication security modules 563 transmit 596 the encrypted hosted telemetry to the hosted payload(s) 507. The host payload(s) 507 then transmits (e.g., passes) 568 the encrypted hosted telemetry to the host payload 506. The host payload 506 transmits the encrypted hosted telemetry to the host payload antenna 582. The host payload antenna 582 transmits 502 the encrypted hosted telemetry to the gateway antenna (e.g., hosted gateway antenna) 587. The host payload antenna 582 transmits 502 the encrypted hosted telemetry utilizing an inband frequency band(s) (i.e. a frequency band(s) that is the same frequency band(s) utilized to transmit payload data, such as hosted payload data). The gateway antenna 587 then transmits 555 (via a secure terrestrial link with IPSec VPN) the encrypted hosted telemetry to the secure enclave 552.

After the secure enclave 552 receives the encrypted hosted telemetry, the secure enclave 552 decrypts the encrypted hosted telemetry utilizing the hosted COMSEC varieties (e.g., COMSEC variety 2 to COMSEC variety N+1) to generate the unencrypted hosted telemetry. The secure enclave 552 then transmits 533 (via a secure terrestrial link with IPSec VPN) the unencrypted hosted telemetry respectively to the hosted users 560 that the unencrypted telemetry is associated.

It should be noted that, in one or more embodiments, the secure enclave 552 transmits 533 (via a secure terrestrial link with IPSec VPN) a confirmation to the hosted users 560 that their requests have been received and are being processed. In one or more embodiments, the secure enclave 552 subsequently transmits 533 (via a secure terrestrial link with IPSec VPN) a notification to the hosted users 560 that their requests have been satisfied (e.g., that the hosted payload(s) 507 has been reconfigured to satisfy the requests).

It should be noted that, in one or more embodiments, the gateway antenna 527 may be a host gateway antenna (i.e. a host owned gateway antenna) or a hosted gateway antenna (i.e. a hosted owned gateway antenna). And, in some embodiments, if the gateway antenna 527 is a host gateway antenna, the gateway antenna 527 will have a frequency band the same as the hosted frequency so that the gateway antenna 527 can communicate with the hosted payload.

Also, it should be noted that, in one or more embodiments, the gateway antenna 587 may be a host gateway antenna (i.e. a host owned gateway antenna) or a hosted gateway antenna (i.e. a hosted owned gateway antenna). And, in some embodiments, if the gateway antenna 587 is a host gateway antenna, the gateway antenna 587 will have a frequency band the same as the hosted frequency so that the gateway antenna 587 can communicate with the hosted payload.

FIG. 6 is a table 600 showing a summary of the various different types of transmission of the host and hosted commands and telemetry that may be employed for the disclosed system 500 of FIG. 5, in accordance with at least one embodiment of the present disclosure. In particular, table 600 comprises a summary of the various different ways (e.g., scenarios A, B, C, D, E, F, G, H, I, J, K, and L) the host commands, host telemetry, hosted commands, and hosted telemetry may be transmitted to and from the vehicle. In particular, the host commands, host telemetry, hosted commands, and hosted telemetry may be transmitted utilizing either out-of-band or inband frequencies. In addition, the hosted commands, when transmitted utilizing inband frequencies, may be transmitted from the secure enclave via the host SOC (or not via the host SOC) and via a gateway antenna to the vehicle. Additionally, the hosted telemetry, when transmitted utilizing inband frequencies, may be transmitted from the vehicle via the host SOC (or not via the host SOC) and via a gateway antenna to the secure enclave.

FIGS. 7A and 7B together show a flow chart for the disclosed method 700 of operation of the disclosed system 100 for satellite operations with a secure enclave for secure inband hosted payload operations for a combined host/hosted payload of FIG. 1, in accordance with at least one embodiment of the present disclosure. At the start 705 of the method 700, a vehicle receives encrypted host commands from a satellite operation portion of a host SOC 710. In one or more embodiments, the encrypted host commands are host commands encrypted by the satellite operation portion of the host SOC utilizing a host COMSEC variety. Then, a host communication security module on the vehicle decrypts the encrypted host commands by utilizing the host COMSEC variety to produce unencrypted host commands 715. A payload on the vehicle and at least bus component on the vehicle are then reconfigured according to the unencrypted host commands 720. Then, the host communication security module encrypts unencrypted host payload telemetry and unencrypted bus telemetry by utilizing the host COMSEC variety to produce encrypted host telemetry 725. The vehicle then transmits the encrypted host telemetry to the satellite operation portion of the host SOC, which decrypts the encrypted host telemetry by utilizing the host COMSEC variety to produce the unencrypted host payload telemetry and the unencrypted bus telemetry 730.

Also, the vehicle receives encrypted hosted commands from a secure enclave of the host SOC 735. In one or more embodiments, the encrypted hosted commands are hosted commands encrypted by the secure enclave by utilizing at least one hosted COMSEC variety. Then, at least one hosted communication security module on the vehicle decrypts the encrypted hosted commands by utilizing at least one hosted COMSEC variety to produce unencrypted hosted commands 740. The payload on the vehicle is then reconfigured according to the unencrypted hosted commands 745. Then, at least one hosted communication security module encrypts unencrypted hosted payload telemetry by utilizing at least one hosted COMSEC variety to produce encrypted hosted telemetry 750. A payload antenna on the vehicle then transmits host payload data, hosted payload data, and the encrypted hosted telemetry to the secure enclave, which decrypts the encrypted hosted telemetry by utilizing at least one hosted COMSEC variety to produce the unencrypted hosted payload telemetry 755. Then, the method 700 ends 760.

FIGS. 8A and 8B together show a flow chart for the disclosed method 800 of operation of the disclosed systems 300, 500 for satellite operations with a secure enclave for secure inband hosted payload operations for a hosted payload(s) of FIGS. 3 and 5, in accordance with at least one embodiment of the present disclosure. At the start 805 of the method 800, a vehicle receives encrypted host commands from a satellite operation portion of a host SOC 810. In one or more embodiments, the encrypted host commands are host commands encrypted by the satellite operation portion of the host SOC utilizing a host COMSEC variety. Then, a host communication security module on the vehicle decrypts the encrypted host commands by utilizing the host COMSEC variety to produce unencrypted host commands 815. A host payload on the vehicle is then reconfigured according to the unencrypted host commands 820. Then, at least one hosted payload on the vehicle is commanded on or off according to the unencrypted host commands 825. The host communication security module then encrypts unencrypted host payload telemetry by utilizing the host COMSEC variety to produce encrypted host telemetry 830. Then, the vehicle transmits the encrypted host telemetry to the satellite operation portion of the host SOC, which decrypts the encrypted host telemetry by utilizing the host COMSEC variety to produce the unencrypted host payload telemetry 835.

In addition, the vehicle receives encrypted hosted commands from a secure enclave of the host SOC 840. In one or more embodiments, the encrypted hosted commands are hosted commands encrypted by the secure enclave by utilizing at least one hosted COMSEC variety. Then, at least one hosted communication security module on the vehicle decrypts the encrypted hosted commands by utilizing at least one hosted COMSEC variety to produce unencrypted hosted commands 850. At least one hosted payload on the vehicle is then reconfigured according to the unencrypted hosted commands 850. Then, at least one hosted communication security module encrypts unencrypted hosted payload telemetry by utilizing at least one hosted COMSEC variety to produce encrypted hosted telemetry 855. A host payload antenna on the vehicle then transmits host payload data 860. Also, a hosted payload antenna on the vehicle transmits hosted payload data 865. In addition, the vehicle transmits the encrypted hosted telemetry to the secure enclave, which decrypts the encrypted hosted telemetry by utilizing at least one hosted COMSEC variety to produce the unencrypted hosted payload telemetry 870. Then, the method 800 ends 875.

FIGS. 9A and 9B together show a table 900 listing a number of various different communications scenarios that may be employed by the disclosed systems 100, 300, 500 for satellite operations with a secure enclave for secure inband hosted payload operations of FIGS. 1, 3 and 5, in accordance with at least one embodiment of the present disclosure. In particular, the table 900 identifies a total of forty-eight (48) different communication scenarios (or combinations) that may be employed by the disclosed systems 100, 300, 500. The some of the columns of the table 900 show the type of communications (e.g., communications on out-of-band or inband frequencies) used for the transmitting and receiving of the host commands (CMD), host telemetry (TLM), hosted commands transmitted via the host SOC, and hosted telemetry transmitted via the host SOC for the disclosed systems 100, 300, 500. Other columns of the table 900 show the routes of transmission (i.e. signal transmission paths) (e.g., either transmitted via the host payload or the hosted payload) for the hosted commands transmitted on inband frequencies from the secure enclave and for the hosted telemetry transmitted on inband frequencies to the secure enclave for the disclosed systems 100, 300, 500. It should be noted that, in one or more embodiments, the disclosed systems 100, 300, 500 for satellite operations with a secure enclave for payload operations may be modified as needed to accommodate any of the communications scenarios shown in table 900.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for payload operations, the method comprising:
    receiving, by a vehicle, encrypted host commands from a satellite operation portion of a host spacecraft operations center (SOC),
        wherein the encrypted host commands are host commands encrypted by the satellite operation portion of the host SOC utilizing a host communication security (COMSEC) variety;
    decrypting, by a host communication security processor on the vehicle, the encrypted host commands by utilizing the host COMSEC variety to produce unencrypted host commands;
    reconfiguring a payload on the vehicle and at least bus component on the vehicle according to the unencrypted host commands;
    encrypting, by the host communication security processor, unencrypted host payload telemetry and unencrypted bus telemetry by utilizing the host COMSEC variety to produce encrypted host telemetry;
    transmitting, by the vehicle, the encrypted host telemetry to the satellite operation portion of the host SOC, which decrypts the encrypted host telemetry by utilizing the host COMSEC variety to produce the unencrypted host payload telemetry and the unencrypted bus telemetry;
    receiving, by the vehicle, encrypted hosted commands from a secure enclave of the host SOC,
    wherein the encrypted hosted commands are hosted commands encrypted by the secure enclave by utilizing at least one hosted COMSEC variety;
    decrypting, by at least one hosted communication security processor on the vehicle, the encrypted hosted commands by utilizing the at least one hosted COMSEC variety to produce unencrypted hosted commands;
    reconfiguring the payload on the vehicle according to the unencrypted hosted commands;
    encrypting, by the at least one hosted communication security processor, unencrypted hosted payload telemetry by utilizing the at least one hosted COMSEC variety to produce encrypted hosted telemetry; and
    transmitting, by a payload antenna on the vehicle, host payload data, hosted payload data, and the encrypted hosted telemetry, wherein the hosted payload data and the encrypted hosted telemetry are transmitted to the secure enclave, which decrypts the encrypted hosted telemetry by utilizing the at least one hosted COMSEC variety to produce the unencrypted hosted payload telemetry;
    wherein the encrypted hosted telemetry is transmitted by the vehicle via one or more of a plurality of hosted telemetry paths based on determining which of the plurality of the hosted telemetry paths is to be used for delivering the encrypted hosted telemetry to the secure enclave, the plurality of hosted telemetry paths utilizing at least one inband frequency band and comprising:
        one or more first hosted telemetry paths each of which passes via the satellite operation portion of the host SOC to the secure enclave; and
        one or more second hosted telemetry paths each of which bypasses the satellite operation portion of the host SOC on the way to the secure enclave;
        wherein the one or more second hosted telemetry paths comprise a path passing from the vehicle to a host gateway antenna and then directly to the secure enclave.

2. The method of claim 1, wherein the encrypted host commands are transmitted from the satellite operation portion of the host SOC utilizing at least one out-of-band frequency band.

3. The method of claim 1, wherein the encrypted host commands are transmitted from the satellite operation portion of the host SOC utilizing at least one inband frequency band, and
    wherein the encrypted host commands are transmitted from the satellite operation portion of the host SOC to the payload antenna on the vehicle via a secure terrestrial link and a gateway antenna.

4. The method of claim 1, wherein the encrypted host telemetry is transmitted from the vehicle utilizing at least one out-of-band frequency band.

5. The method of claim 1, wherein the encrypted host telemetry is transmitted from the vehicle utilizing at least one inband frequency band, and
wherein the encrypted host telemetry is transmitted from the payload antenna on the vehicle to the satellite operation portion of the host SOC via a gateway antenna and a secure terrestrial link.

6. The method of claim 1, wherein the encrypted hosted commands are transmitted from the secure enclave utilizing at least one out-of-band frequency band, and
wherein the encrypted hosted commands are transmitted from the secure enclave to the vehicle via the satellite operation portion of the host SOC.

7. The method of claim 1, wherein the encrypted hosted commands are transmitted from the secure enclave utilizing at least one inband frequency band via one or more of a plurality of hosted command paths comprising:
one or more first hosted command paths each of which passes via the satellite operation portion of the host SOC on the way from the secure enclave to the vehicle; and
one or more second hosted command paths each of which bypasses the satellite operation portion of the host SOC on the way from the secure enclave to the vehicle.

8. The method of claim 7, wherein the one or more second hosted command paths comprise:
a path from the secure enclave directly to a host gateway antenna transmitting directly to a host payload antenna; and
a path from the secure enclave directly to a hosted gateway antenna transmitting directly to a hosted payload antenna.

9. The method of claim 7, wherein the encrypted hosted commands are transmitted from the secure enclave to the payload antenna on the vehicle via a secure terrestrial link and a gateway antenna.

10. The method of claim 1, wherein:
the path passing from the vehicle to the host gateway antenna and then directly to the secure enclave passes through a host payload antenna transmitting directly to the host gateway antenna; and
the one or more second telemetry paths further comprise a path through a hosted payload antenna transmitting directly to a hosted gateway antenna and then directly to the secure enclave.

11. The method of claim 1, wherein the encrypted hosted telemetry is transmitted from the payload antenna on the vehicle to the secure enclave via a gateway antenna and a secure terrestrial link.

12. The method of claim 1, wherein the encrypted hosted telemetry is transmitted from the payload antenna on the vehicle to the secure enclave via the satellite operation portion of the host SOC.

13. A method for payload operations, the method comprising:
receiving, by a vehicle, encrypted host commands from a satellite operation portion of a host spacecraft operations center (SOC),
wherein the encrypted host commands are host commands encrypted by the satellite operation portion of the host SOC utilizing a host communication security (COMSEC) variety;
decrypting, by a host communication security processor on the vehicle, the encrypted host commands by utilizing the host COMSEC variety to produce unencrypted host commands;
reconfiguring a host payload on the vehicle according to the unencrypted host commands;
commanding at least one hosted payload on the vehicle one of on or off according to the unencrypted host commands;
encrypting, by the host communication security processor, unencrypted host payload telemetry by utilizing the host COMSEC variety to produce encrypted host telemetry;
transmitting, by the vehicle, the encrypted host telemetry to the satellite operation portion of the host SOC, which decrypts the encrypted host telemetry by utilizing the host COMSEC variety to produce the unencrypted host payload telemetry;
receiving, by the vehicle, encrypted hosted commands from a secure enclave of the host SOC, wherein the encrypted hosted commands are received from the secure enclave via one or more of a plurality of hosted command paths based on determining which of the plurality of the hosted command paths is to be used for delivering the encrypted hosted commands to the vehicle, the plurality of hosted command paths utilizing at least one inband frequency band and comprising:
one or more first hosted command paths each of which passes via the satellite operation portion of the host SOC on the way from the secure enclave to the vehicle; and
one or more second hosted command paths each of which bypasses the satellite operation portion of the host SOC on the way from the secure enclave to the vehicle;
wherein the one or more second hosted command paths comprise a path passing from the secure enclave directly to a host gateway antenna and then directly to the vehicle;
wherein the encrypted hosted commands are hosted commands encrypted by the secure enclave by utilizing at least one hosted COMSEC variety;
decrypting, by at least one hosted communication security processor on the vehicle, the encrypted hosted commands by utilizing the at least one hosted COMSEC variety to produce unencrypted hosted commands;
reconfiguring the at least one hosted payload on the vehicle according to the unencrypted hosted commands;
encrypting, by the at least one hosted communication security processor, unencrypted hosted payload telemetry by utilizing the at least one hosted COMSEC variety to produce encrypted hosted telemetry;
transmitting, by a host payload antenna on the vehicle, host payload data;
transmitting, by a hosted payload antenna on the vehicle, hosted payload data; and
transmitting, by the vehicle, the encrypted hosted telemetry, to the secure enclave, which decrypts the encrypted hosted telemetry by utilizing the at least one hosted COMSEC variety to produce the unencrypted hosted payload telemetry.

14. The method of claim 13, wherein the encrypted host commands are transmitted from the satellite operation portion of the host SOC utilizing at least one out-of-band frequency band.

15. The method of claim 13, wherein the encrypted host commands are transmitted from the satellite operation portion of the host SOC utilizing at least one inband frequency band,
  wherein the encrypted host commands are transmitted from the satellite operation portion of the host SOC to one of the host payload antenna or the hosted payload antenna on the vehicle via a secure terrestrial link and a gateway antenna, and
  wherein the gateway antenna is one of a host gateway antenna or a hosted gateway antenna.

16. The method of claim 13, wherein the encrypted host telemetry is transmitted from the vehicle utilizing at least one out-of-band frequency band.

17. The method of claim 13, wherein the encrypted host telemetry is transmitted from the vehicle utilizing at least one inband frequency band,
  wherein the encrypted host telemetry is transmitted from one of the host payload antenna or the hosted payload antenna on the vehicle to the satellite operation portion of the host SOC via a gateway antenna and a secure terrestrial link, and
  wherein the gateway antenna is one of a host gateway antenna or a hosted gateway antenna.

18. The method of claim 13, wherein the encrypted hosted commands are transmitted from the secure enclave utilizing at least one out-of-band frequency band, and
  wherein the encrypted hosted commands are transmitted from the secure enclave to the vehicle via the satellite operation portion of the host SOC.

19. The method of claim 13, wherein the encrypted hosted commands are transmitted from the secure enclave utilizing at least one inband frequency band.

20. The method of claim 13, wherein:
  the path passing from the secure enclave directly to the host gateway antenna and then directly to the vehicle passes through the host payload antenna; and
  the one or more second hosted command paths further comprise a path from the secure enclave directly to a hosted gateway antenna transmitting directly to the hosted payload antenna.

21. The method of claim 19, wherein the encrypted hosted commands are transmitted from the secure enclave to one of the host payload antenna or the hosted payload antenna on the vehicle via a secure terrestrial link and a gateway antenna, and
  wherein the gateway antenna is one of a host gateway antenna or a hosted gateway antenna.

22. The method of claim 1, wherein the encrypted hosted telemetry is transmitted from the vehicle utilizing at least one out-of-band frequency band.

23. The method of claim 13, wherein the encrypted hosted telemetry is transmitted from the vehicle utilizing at least one inband frequency band; and
  the encrypted hosted telemetry is transmitted by the vehicle via one or more of a plurality of hosted telemetry paths based on determining which of the plurality of the hosted telemetry paths is to be used for delivering the encrypted hosted telemetry to the secure enclave, the plurality of hosted telemetry paths comprising:
    one or more first hosted telemetry paths each of which passes via the satellite operation portion of the host SOC on the way from the vehicle to the secure enclave; and
    one or more second hosted telemetry paths each of which bypasses the satellite operation portion of the host SOC on the way from the vehicle to the secure enclave.

24. The method of claim 23, wherein the one or more second hosted telemetry paths comprise:
  a path through the host payload antenna transmitting directly to a host gateway antenna and then directly to the secure enclave; and
  a path through the hosted payload antenna transmitting directly to a hosted gateway antenna and then directly to the secure enclave.

25. The method of claim 23, wherein the encrypted hosted telemetry is transmitted from one of the host payload antenna or the hosted payload antenna on the vehicle to the secure enclave via a gateway antenna and a secure terrestrial link, and
  wherein the gateway antenna is one of a host gateway antenna or a hosted gateway antenna.

26. A method for payload operations, the method comprising:
  receiving, by a vehicle, encrypted host commands from a satellite operation portion of a host spacecraft operations center (SOC), and decrypting and executing the host commands to achieve payload reconfiguration;
  receiving, by the vehicle, encrypted hosted commands from a secure enclave of the host SOC, and decrypting and executing the hosted commands to achieve payload reconfiguration;
  transmitting, by the vehicle, encrypted host telemetry to the satellite operation portion of the host SOC; and
  transmitting, by the vehicle, encrypted hosted telemetry to the secure enclave of the host SOC;
  wherein the encrypted hosted commands and/or encrypted hosted telemetry are transmitted via one or more communication paths each of which is selected from a plurality of available communication paths based on determining which of the plurality of the communications paths is to be used for delivering the encrypted hosted commands to the vehicle and/or delivering the encrypted hosted telemetry to the secure enclave, the plurality of communication paths utilizing at least one inband frequency band and including:
    at least one communication path passing through the satellite operation portion of the host SOC on the way between the secure enclave and the vehicle; and
    at least one communication path bypassing the satellite operation portion of the host SOC and passing between the vehicle and a host gateway antenna and directly between the host gateway antenna and the secure enclave.

* * * * *